US012576608B2

(12) United States Patent
Hartmann et al.

(10) Patent No.: US 12,576,608 B2
(45) Date of Patent: Mar. 17, 2026

(54) METHOD OF MANUFACTURING A TUNABLE MIDSOLE FOR AN ARTICLE OF FOOTWEAR

(71) Applicant: PUMA SE, Herzogenaurach (DE)

(72) Inventors: Matthias Hartmann, Forchheim (DE); Reinhold Sussmann, Scheinfeld (DE)

(73) Assignee: PUMA SE, Herzogenaurach (DE)

( * ) Notice: Subject to any disclaimer, the term of this patent is extended or adjusted under 35 U.S.C. 154(b) by 24 days.

(21) Appl. No.: 18/218,383

(22) Filed: Jul. 5, 2023

(65) Prior Publication Data

US 2024/0017509 A1     Jan. 18, 2024

Related U.S. Application Data

(60) Provisional application No. 63/388,523, filed on Jul. 12, 2022.

(51) Int. Cl.
| | |
|---|---|
| *B29D 35/12* | (2010.01) |
| *A43B 1/028* | (2022.01) |
| *A43B 1/04* | (2022.01) |
| *A43B 13/04* | (2006.01) |

(52) U.S. Cl.
CPC ............ *B29D 35/122* (2013.01); *A43B 1/028* (2022.01); *A43B 1/04* (2013.01); *A43B 13/04* (2013.01)

(58) Field of Classification Search
None
See application file for complete search history.

(56) References Cited

U.S. PATENT DOCUMENTS

| | | |
|---|---|---|
| RE37,932 E | 12/2002 | Baldwin |
| 2002/0137808 A1* | 9/2002 | Gehlsen ................ B29C 48/625 |
| | | 521/79 |

(Continued)

FOREIGN PATENT DOCUMENTS

| | | | |
|---|---|---|---|
| CN | 102911392 A | * | 2/2013 |
| CN | 109228099 A | | 4/2021 |

(Continued)

OTHER PUBLICATIONS

Japanese Office Action based off Patent Application No. 2023-112296, Jul. 2, 2024, 5 pages.

(Continued)

*Primary Examiner* — Farah Taufiq
(74) *Attorney, Agent, or Firm* — Quarles & Brady LLP

(57) ABSTRACT

A method of making a midsole includes selecting a plurality of yarns. At least two yarns of the plurality of yarns have different properties relative to one another. The method further includes bundling the plurality of yarns to form a bundled yarn structure and intertwining the bundled yarn structure to form a twisted yarn structure. Further, the method includes depositing the twisted yarn structure into a first mold within an autoclave and applying a supercritical fluid to the twisted yarn structure. The method further includes supercritical fluid infiltrating and saturating the twisted yarn structure, depressurizing the autoclave to cause a foaming process therein to convert the twisted yarn structure into an anisotropic foam blank, and depositing the anisotropic foam blank within a second mold that is configured as a midsole for an article of footwear.

14 Claims, 27 Drawing Sheets

(56)     References Cited

U.S. PATENT DOCUMENTS

2011/0104478 A1*  5/2011  Simard ................ B29C 44/352
                                                    264/48
2018/0368510 A1* 12/2018  O'Haire .............. A43B 23/042
2020/0281314 A1   9/2020  Stockbridge
2021/0114324 A1   4/2021  Liu
2021/0148013 A1   5/2021  Baranek et al.
2022/0125158 A1   4/2022  Ni et al.

FOREIGN PATENT DOCUMENTS

JP          S5354246  U     5/1978
JP           7106918  B2  *  7/2022

OTHER PUBLICATIONS

European Search Report from Application No. 23183273.4, mailed
Dec. 22, 2023 (5 pages).
Japan Patent Office, Notice of Reasons for Refusal, Application No.
2024-205197, Jan. 20, 2026, 8 pages.
Japan Patent Office, Notice of Reasons for Refusal, Application No.
2024-205198, Jan. 20, 2026, 4 pages.

* cited by examiner

200

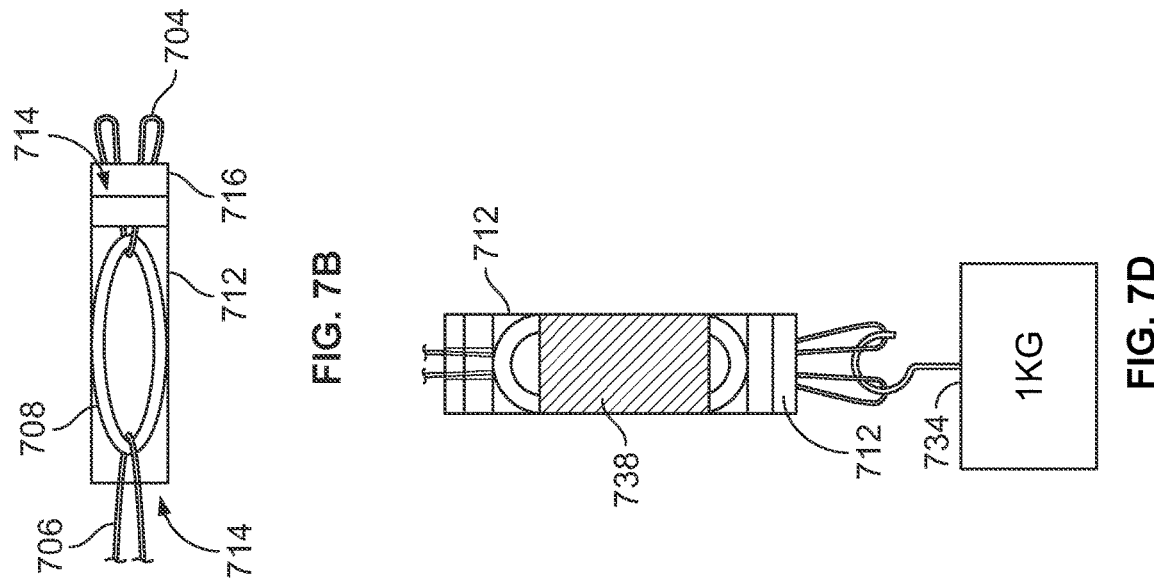
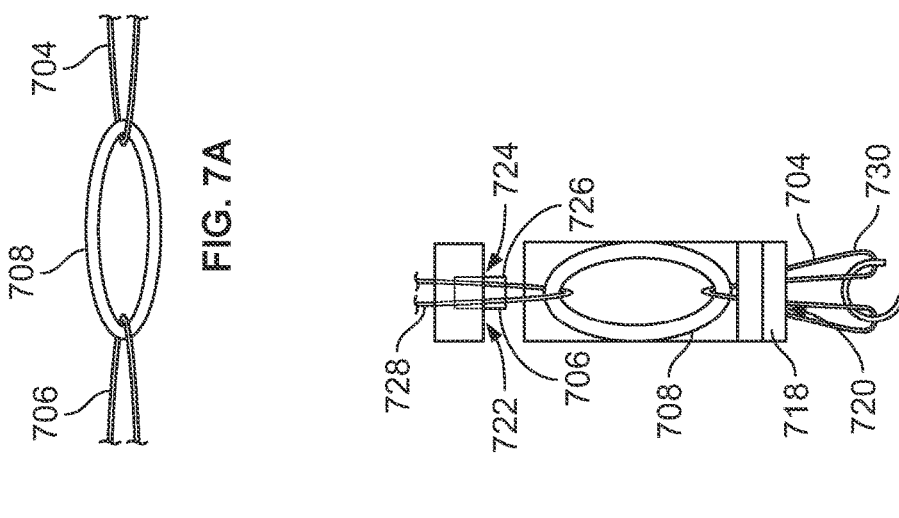

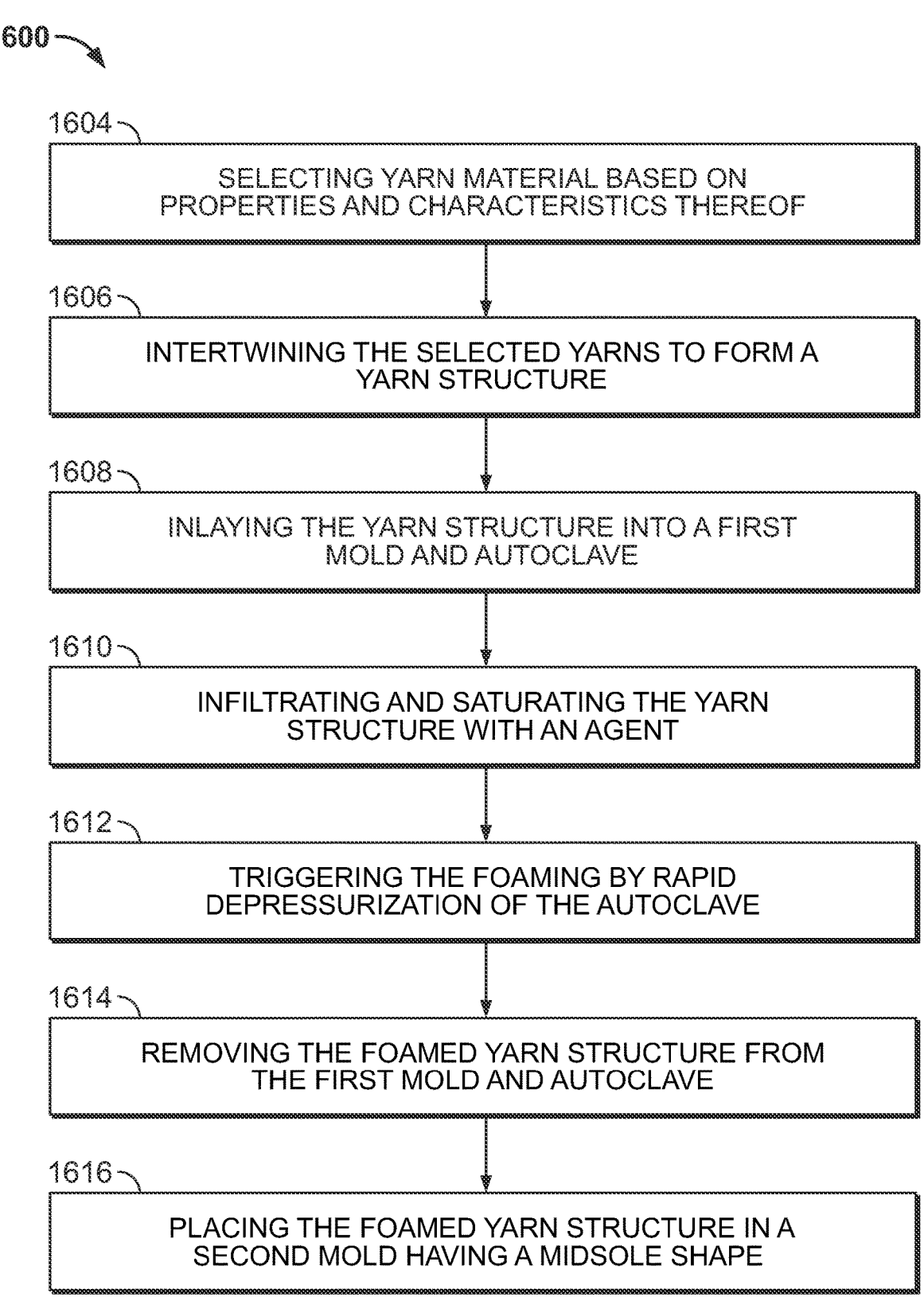

1600

1604 — SELECTING YARN MATERIAL BASED ON PROPERTIES AND CHARACTERISTICS THEREOF

1606 — INTERTWINING THE SELECTED YARNS TO FORM A YARN STRUCTURE

1608 — INLAYING THE YARN STRUCTURE INTO A FIRST MOLD AND AUTOCLAVE

1610 — INFILTRATING AND SATURATING THE YARN STRUCTURE WITH AN AGENT

1612 — TRIGGERING THE FOAMING BY RAPID DEPRESSURIZATION OF THE AUTOCLAVE

1614 — REMOVING THE FOAMED YARN STRUCTURE FROM THE FIRST MOLD AND AUTOCLAVE

1616 — PLACING THE FOAMED YARN STRUCTURE IN A SECOND MOLD HAVING A MIDSOLE SHAPE

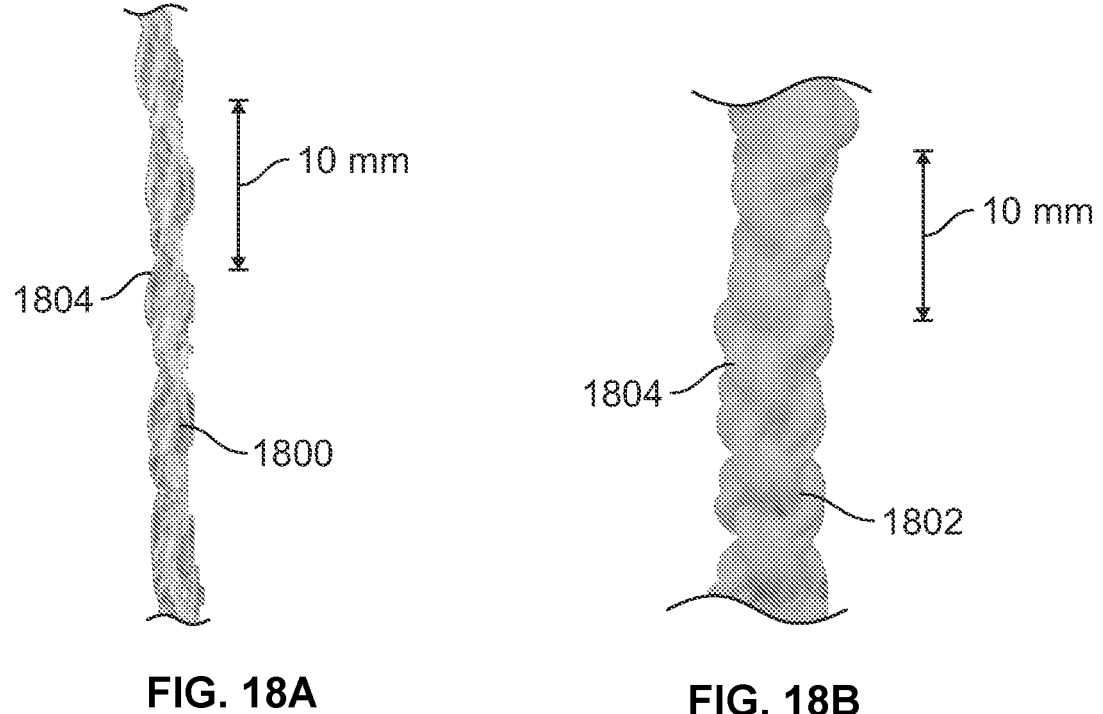
FIG. 18A                    FIG. 18B

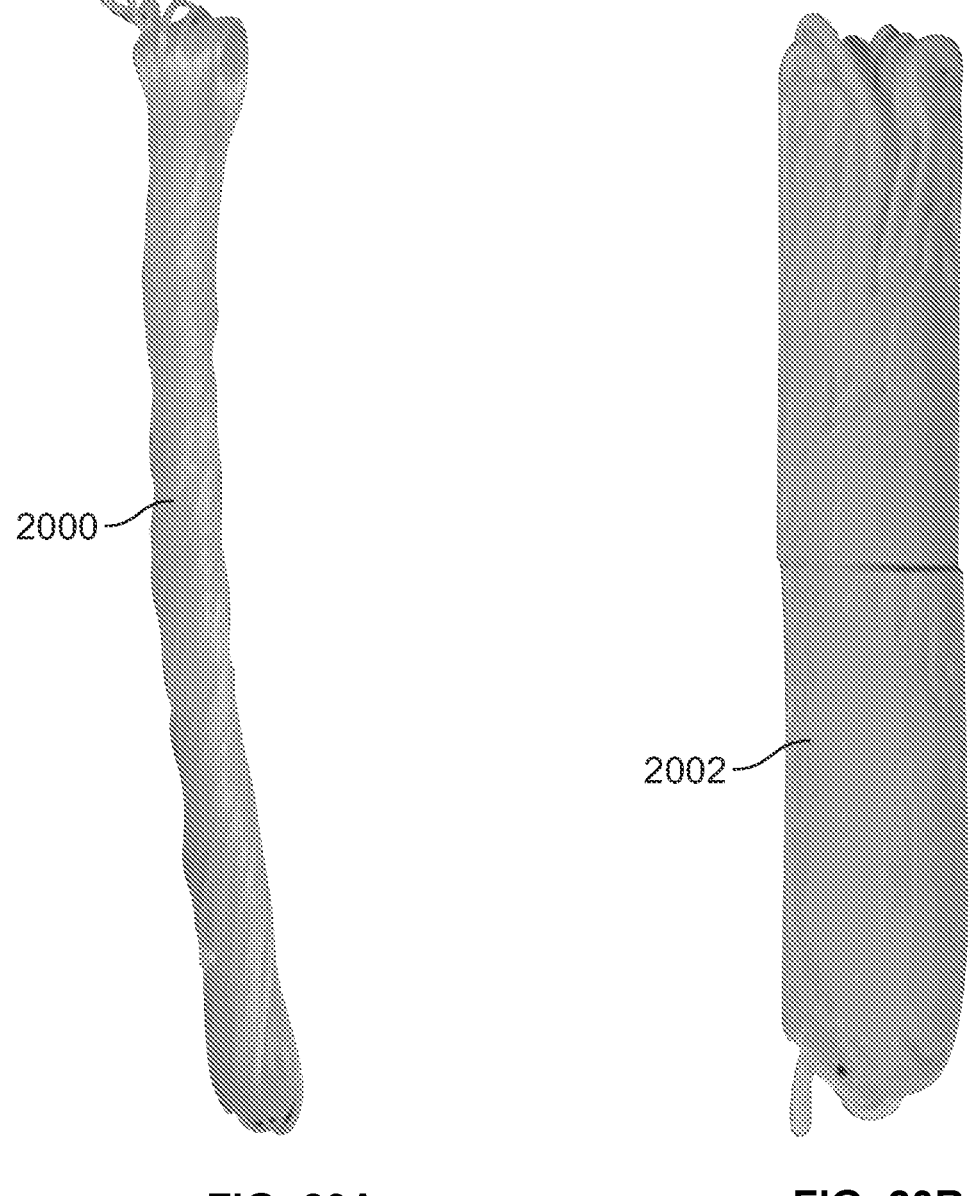
FIG. 20A                              FIG. 20B

METHOD OF MANUFACTURING A TUNABLE MIDSOLE FOR AN ARTICLE OF FOOTWEAR

CROSS REFERENCE TO RELATED APPLICATIONS

This application claims the benefit of and priority to U.S. Provisional Application No. 63/388,523, filed on Jul. 12, 2022, which is incorporated by reference herein in its entirety.

REFERENCE REGARDING FEDERALLY SPONSORED RESEARCH OR DEVELOPMENT

Not applicable

SEQUENCE LISTING

Not applicable

BACKGROUND

1. Field of the Disclosure

The present disclosure relates generally to an article of footwear that includes an anisotropic foam fabricated from various pre-oriented yarn structures.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and an insole. The outsole may provide traction to a bottom surface of the sole, and the midsole may be attached to an inner surface of the outsole. The sole may also include additional components, such as plates, embedded with the sole to increase the overall stiffness of the sole and reduce energy loss during use.

The upper generally extends upward from the sole and defines an interior cavity that completely or partially encases a foot. In most cases, the upper extends over the instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of shoe tightness. The tongue may further be manipulable by a user to permit entry or exit of a foot from the internal space or cavity. In addition, the lacing system may allow a user to adjust certain dimensions of the upper or the sole, thereby allowing the upper to accommodate a wide variety of foot types having varying sizes and shapes.

The upper may comprise a wide variety of materials, which may be chosen based on one or more intended uses of the shoe. The upper may also include portions comprising varying materials specific to a particular area of the upper. For example, added stability may be desirable at a front of the upper or adjacent a heel region so as to provide a higher degree of resistance or rigidity. In contrast, other portions of a shoe may include a soft woven textile to provide an area with stretch-resistance, flexibility, air-permeability, or moisture-wicking properties.

Sole assemblies generally extend between a ground surface and the upper. In some examples, the sole assembly includes an outsole that provides abrasion-resistance and traction with the ground surface, and a multi-component midsole that provides lever-like assistance and toe stabilization. The multi-component midsole includes a lower midsole cushioning member, an upper midsole cushioning member, and a plate positioned between the upper cushioning member and the lower cushioning member. The plate, typically formed from carbon fiber or other composite materials, harnesses a kinetic energy and a resulting momentum through a user's foot strike, assisting the users to engage in athletic activities with less fatigue.

While many currently available shoes have varying features related to the above noted properties, many shoes, and more particularly the midsole thereof, may be further optimized.

SUMMARY

In some aspects, a method of making a midsole includes selecting a plurality of yarns, wherein at least two yarns of the plurality of yarns have different properties relative to one another. The method further includes bundling the plurality of yarns to form a bundled yarn structure and intertwining the bundled yarn structure to form a twisted yarn structure. The intertwining comprising the steps of fixing an end of the bundled yarn structure, applying axial tension to the bundled yarn structure, and rotating the bundled yarn structure to form the twisted yarn structure. Further, the method includes depositing the twisted yarn structure into a first mold within an autoclave and applying a supercritical fluid to the twisted yarn structure. The method further includes the steps of supercritical fluid infiltrating and saturating the twisted yarn structure, depressurizing the autoclave to cause a foaming process therein to convert the twisted yarn structure into an anisotropic foam blank, and depositing the anisotropic foam blank within a second mold that is configured as a midsole for an article of footwear.

In some embodiments, at least one yarn of the plurality of yarns is composed of at least one of a thermoplastic polymer, a thermosetting polymer, or an elastomeric polymer. In some embodiments, the anisotropic foam blank includes a first cell growth direction that is parallel to a longitudinal direction of the twisted yarn structure. In some embodiments, the anisotropic foam blank includes a second cell growth direction perpendicular to the longitudinal direction of the twisted yarn structure. In some embodiments, the supercritical fluid comprises a superheated water, a supercritical carbon dioxide, or both. In some embodiments, a diameter of at least one yarn of the plurality of yarns is increased by at least 120%. In some embodiments, a density of at least one yarn of the plurality of yarns is decreased by at least 50%.

In some aspects, a method of making a midsole includes selecting a plurality of yarns, wherein at least two yarns of the plurality of yarns have different material properties relative to one another. The method includes bundling the plurality of yarns to form a bundled yarn structure and intertwining the bundled yarn structure using a braiding technique to form a braided yarn structure. An axial tension is applied to the bundled yarn structure. The method further includes depositing the braided yarn structure into a first mold and within an autoclave and applying a supercritical fluid to the braided yarn structure. The method also includes the steps of supercritical fluid infiltrating and saturating the braided yarn structure, depressurizing the autoclave to cause a foaming process therein to convert the braided yarn structure into an anisotropic foam blank, and depositing the anisotropic foam blank within a second mold that is configured as a midsole for an article of footwear.

In some embodiments, at least one yarn of the plurality of yarns is composed of at least one of a thermoplastic polymer, a thermosetting polymer, or an elastomeric polymer. In some embodiments, the supercritical fluid comprises a superheated water, a supercritical carbon dioxide, or both. In some embodiments, a diameter of at least one yarn of the plurality of yarns is increased by at least 120%. In some embodiments, a density of at least one yarn of the plurality of yarns is decreased by at least 50%. In some embodiments, a circumferential shear strain of the plurality of yarns is greater than 0.05. In some embodiments, the braiding technique is a Kumihimo braiding technique.

In some aspects, a method of making a tunable midsole, as described herein, comprises utilizing an anisotropic foam. Anisotropic foam blanks may be used in lieu of multi-component midsole constructions, such as to replace a plate that is disposed between or within segments of the midsole. Anisotropic foam blanks can be formed from intertwining multiple yarns in a pre-oriented manner. The anisotropic foam blanks are tunable and functionable foam materials that are pre-oriented to provide customized, localized features, such as cushioning, stability, energy dissipation or absorption, puncture resistance, propulsion, and the like. Further, the anisotropic foam materials of the present disclosure reduce the need for assembling or installing multiple components, thereby reducing waste associated with excess materials and minimizing energy consumption associated with the labor and transport of assembling such constructions.

In some embodiments, a midsole comprising anisotropic foam material may define a forefoot region, a midfoot region, and a heel region of the midsole. The anisotropic foam material comprises intertwined yarn structures that includes a plurality of yarns. The intertwined yarn structure may be formed as a non-woven structure, a woven structure, a knitted structure, a braided structure, or a twisted structure.

In some embodiments, the plurality of yarns comprises a polymeric core. The polymeric core comprises a first material. The first material may be a thermoplastic polymer, a thermosetting polymer, or an elastomeric polymer. In some embodiments, the thickness, denier, and tear strength of the polymeric core are different based on the material of the polymeric core.

In some embodiments, the core material comprises a second polymeric material, and the second polymeric material is different from the first polymeric material. The core material may comprise multiple materials or the different cores may comprise different materials. The number of cores is different based on the intertwined yarn structure.

In some embodiments, a solvent or a blowing agent is impregnated into the intertwined yarn structure to form a multicellular foam, wherein the orientation of the cell growth direction provides anisotropic properties to the foam. The foam may include unidirectional cell growth, bidirectional cell growth, and radial cell growth. The cell growth direction incorporated with the different intertwinements of the yarn structures provides a unique anisotropic characteristic.

In some embodiments, the intertwined structure and a supercritical solvent are subjected to a pressurized autoclave, wherein the molecules of the supercritical solvent rapidly convert to gas to form a plurality of polyhedral cells within the materials of the yarn structure, and wherein the orientation of the cell growth direction provides anisotropy to the yarn structure. The solvent may be a supercritical fluid such as carbon dioxide or nitrogen, or a superheated fluid such as water. The intertwined yarn structure may be subjected to both supercritical fluid and superheated fluid to form an anisotropic foam. As a result of the foaming process, the diameter of the yarn may increase by more than at least 10%. Depending on the material and the solvent, the foam may exhibit a large increase in diameter.

In some embodiments, the anisotropic foam undergoes a second molding process to press the anisotropic foam and give the midsole a particular shape. The anisotropic foams may be pre-oriented prior to the second molding process to provide different functionalities without including multiple components within the midsole, such as an upper midsole, a lower midsole, and a plate.

In some embodiments, the foaming process of a yarn structure includes the selection of materials for the yarns and the characteristics of the yarns, including, but not limited to, diameter, denier, tear strength, and color. The yarn structure is created after intertwining the selected yarns in a specific manner and being pre-oriented within a mold. The mold is placed in an autoclave where the yarn structure is softened and infiltrated with a blowing agent. The blowing agent induces cell growth in a specific direction during cell nucleation and is rapidly depressurized creating the anisotropic foam. The foam undergoes a second compression molding step to give the foam the particular shape of the midsole.

In some embodiments, the yarn structure is formed by twisting the yarns under controlled tension and twist angle. The control of tension is provided by small weights, and the twist angle may be controlled by the pitch of rotation.

In some embodiments, the yarn structure is formed by braiding the yarns using a Kumihimo disk. The Kumihimo disk provides controlled tension. The tension is provided by small weights at the end of a bobbin.

In some embodiments, the yarn structure is pre-oriented within a mold. The mold defines a forefoot region, a midfoot region, and a heel region of the midsole. The mold comprises different yarn structures depending on the region, as different yarn structures provide different functionalities, cushioning, and benefits that are desirable for the specific region. To achieve the desirable properties and functionalities, different types of yarn structures may be stacked, bundled, and or sandwiched.

In some embodiments, a second compression molding of the anisotropic foam comprising the yarn structures occurs during or after the foaming of the yarn at least 40 degrees above the ambient or operating parameters of the foam.

In some aspects, an article of footwear includes an upper and a midsole having a forefoot region, a heel region, and a midfoot region. The midsole includes a pre-oriented anisotropic foam in at least one of the forefoot region, heel region, or midfoot region.

In some embodiments, the pre-oriented anisotropic foam is provided in the form of discrete segments including a forefoot segment, a heel segment, and a midfoot segment. In some embodiments, the midsole is a unitary structure having the pre-oriented anisotropic foam in each of the forefoot region, the heel region, and the midfoot region. In some embodiments, the midsole varies in at least one of a flexibility or a stiffness among the forefoot region, the heel region, and the midfoot region. In some embodiments, the midsole is provided with a plate that is in contact with the pre-oriented anisotropic foam. In some embodiments, the pre-oriented anisotropic foam is formed by at least one of a braided yarn structure or a twisted yarn structure.

Other aspects regarding the method of manufacturing a tunable midsole foam herein, including processes, features, and advantages thereof, will become apparent to one of ordinary skill in the art upon examination of the figures and detailed description herein. Therefore, all such aspects of the process of manufacturing a tunable midsole foam are intended to be included in the detailed description and this summary.

BRIEF DESCRIPTION OF THE DRAWINGS

FIG. 7A is a first step in a sequence of fabricating a twisted yarn with controlled pitch and tension;

FIG. 7B is a second step in a sequence of fabricating a twisted yarn with controlled pitch and tension;

FIG. 7C is a third step in a sequence of fabricating a twisted yarn with controlled pitch and tension;

FIG. 7D is a fourth step in a sequence of fabricating a twisted yarn with controlled pitch and tension;

FIG. 16 is a flow chart describing an exemplary foaming process of a yarn structure;

FIG. 18A is a perspective view of a braided yarn structure;

FIG. 18B is a perspective view of a foamed braided yarn structure;

FIG. 20A is a perspective view of a twisted yarn structure;

FIG. 20B is a perspective view of a foamed twisted yarn structure;

DETAILED DESCRIPTION OF THE DRAWINGS

The following discussion and accompanying figures disclose various embodiments or configurations of a midsole comprising a variety of yarn structures. Although embodiments are disclosed with reference to a sports shoe, such as a running shoe, tennis shoe, basketball shoe, etc., concepts associated with embodiments of the shoe may be applied to a wide range of footwear and footwear styles, including cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels.

The term "about," as used herein, refers to variations in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to a tunable midsole for footwear that is produced using supercritical foaming technology. In particular, the midsole of the present disclosure includes an anisotropic foam that is manufactured using supercritical technology and may be fabricated by intertwining one or more polymer yarns to form a yarn structure. The yarn structures are pre-oriented, such as by using the braiding or twisting techniques described herein, and are impregnated by a supercritical fluid and/or a superheated fluid to form an anisotropic foam. The pre-oriented anisotropic foam blank is compressed to the shape of a midsole to form a tunable midsole without losing the performance benefits of a multicomponent midsole.

The midsole may be a single polymeric material or may be a blend of materials, such as an EVA copolymer, a thermoplastic polyurethane (TPU), a polyester block amide (PEBA) copolymer, and/or an olefin block copolymer. Further, the midsole may also be formed from a supercritical foaming process, e.g., physical foaming, chemical foaming, that uses a supercritical gas, e.g., $CO_2$, $N_2$, or mixtures thereof, to foam a material, e.g., EVA, TPU, TPE, or mixtures thereof. In such embodiments, the midsole may be manufactured using a process that is performed in an autoclave, an injection molding apparatus, or any sufficiently heated/pressurized container that can process the mixing of a supercritical fluid (e.g., $CO_2$, $N_2$, or mixtures thereof) with a polymeric material (e.g., TPU, EVA, polyolefin elastomer, or mixtures thereof).

Figure 1:
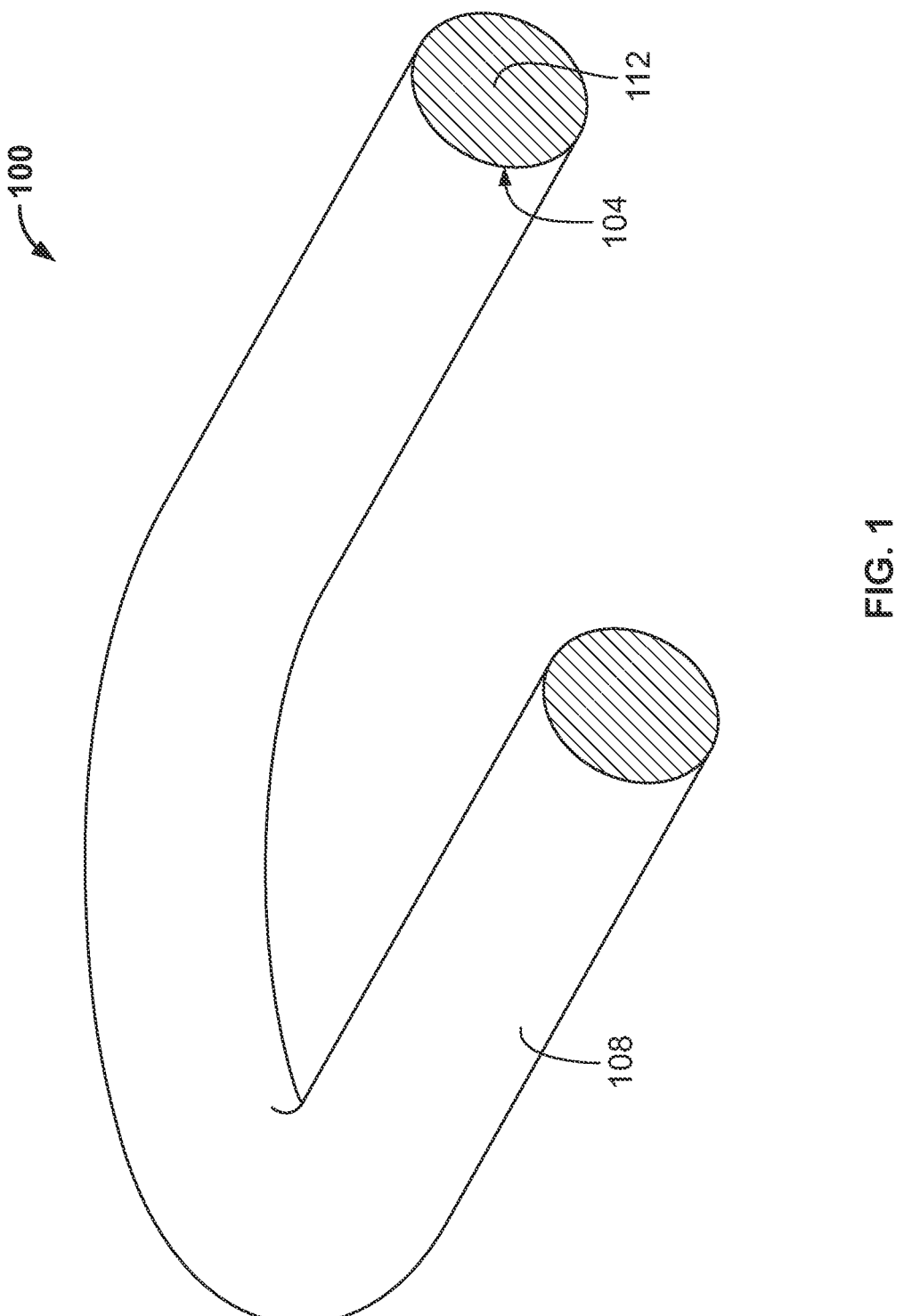
FIG. 1 is a cross-sectional view of a polymer yarn comprising a single core.

The terms "a yarn," "a fiber," or "a filament" herein are used interchangeably and refer to an elongated piece of material. FIG. 1 depicts a cross-sectional view of a yarn 100 comprising a single core 104. A yarn 100 comprising a single core 104 is called a monoyarn 108. A monoyarn 108 generally comprises a single material. In some embodiments, the monoyarn 108 may be formed from a polymeric material such as polyester, polyethylene terephthalate (PET), polyethersulfone (PES), or the like. However, a monoyarn 108 comprising one or more different materials may be formed.

Figure 2:
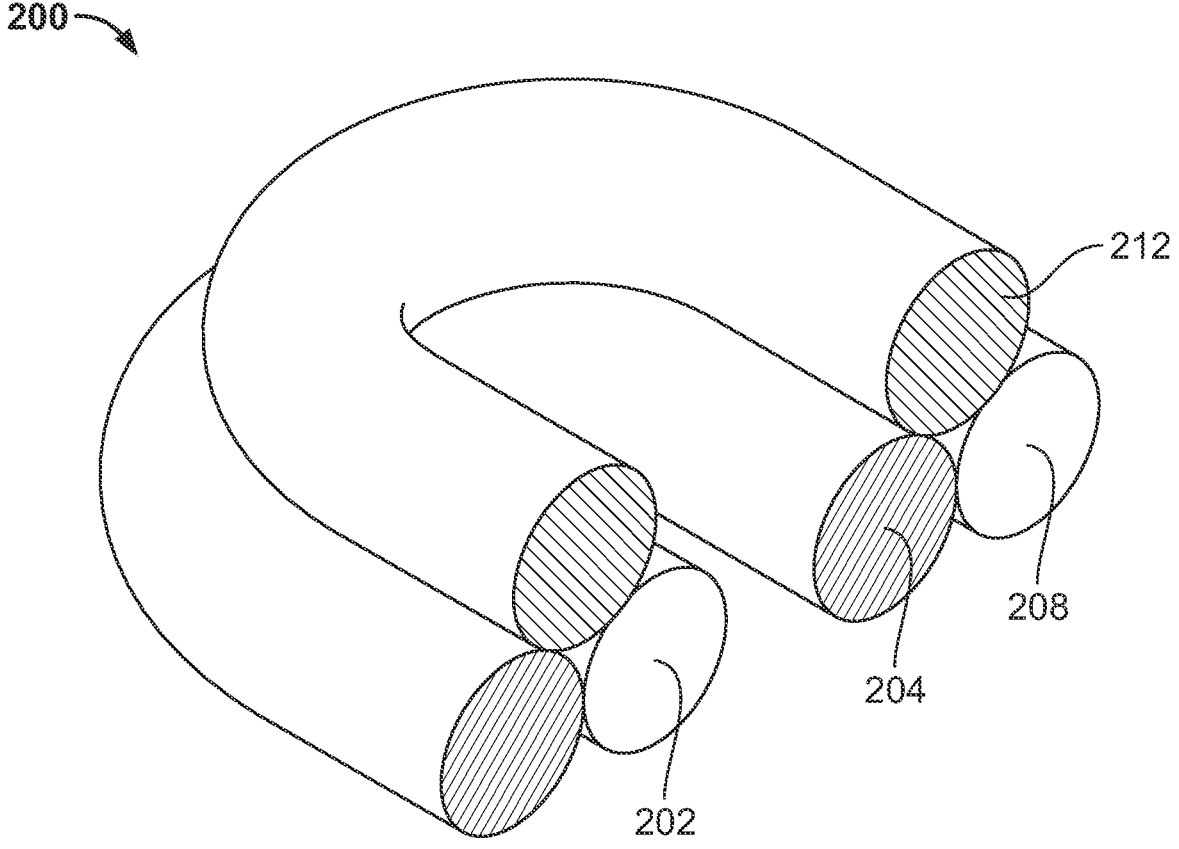
FIG. 2 is another cross-sectional view of multiple polymer yarns comprising a single core with different characteristics.

FIG. 2 depicts another cross-sectional view of multiple polymer yarns 200 comprising a polymer yarn 202 with different characteristics. The multiple polymer yarns 200 comprises a first polymer yarn 204 with a first characteristic, a second polymer yarn 208 with a second characteristic that is different from the first characteristic, and a third polymer yarn 212 with a third characteristic that is different from the first and second characteristics. In some embodiments, the multiple polymer yarns 200 may be formed of the same material or may be formed of two or more different materials. The multiple polymer yarn 200 may comprise polymer yarns with varying properties or varying visual characteristics. For example, the polymer yarn 202 of the multiple polymer yarn 200 may be formed from any one or a combination of polymers and/or any other suitable materials such as, but not limited to thermoplastic polyurethane (TPU), thermoplastic elastomers (TPE), thermoplastic copolyester (TPC), and polyamide (nylon).

In some embodiments, the multiple polymer yarns 200 may be formed from polymer yarns 202 with the same diameter, or the multiple polymer yarns 200 may be formed of one or more polymer yarns 202 with different diameters. In some embodiments, the multiple polymer yarns 200 may be formed from polymer yarns 202 of the same or different tear strength. In some embodiments, the multiple polymer yarns 200 may be formed from polymer yarns 202 of the same or different denier, i.e., the density of a single strand of yarn. In some embodiments, the multiple polymer yarn 200 may be coated with a different substance or material, and the thickness of the coating may be different between the polymer yarns 202. The multiple polymer yarn 200 may be formed from polymer yarns of the same or different colors. In some embodiments, the multiple polymer yarn 200 may comprise polymer yarns 202 of varying properties such as, but not limited to, material, diameter, tear strength, denier, coating, and color.

The polymer is a substance or a material consisting of a repeating chain of monomers, such as a homopolymer or a copolymer. A natural polymer is a naturally occurring material such as silk, wool, rubber, cellulose, and proteins. A synthetic polymer is derived from petroleum oil and is artificially made. Synthetic polymers are categorized into four different groups such as a thermoplastic polymer, a thermoset polymer, an elastomer, and synthetic fibers.

Under applied heat, the thermoplastic polymer can be either amorphous or crystalline. The thermoplastic polymer becomes pliable at elevated temperatures and solidifies upon cooling. For example, FIG. 1 illustrates a cross-section of the yarn 100 includes a thermoplastic polymer core 112.

The thermoplastic polymer core 112 may include a synthetic thermoplastic polymer such as thermoplastic polyurethane (TPU), polyethylene (PE), polystyrene (PS), polyamides (Nylon), polylactic acid (PLA), polypropylene (PP), polyvinyl chloride (PVC), and polycarbonate (PC). The thermoplastic polymers may comprise from about 5 weight percent composition to about 100 weight percent composition of the thermoplastic polymer based on the total weight of the thermoplastic polymer.

Generally speaking, the thermosetting polymer is a polymer that is obtained by irreversible hardening. Initially, the thermosetting polymers behave like the thermoplastic polymers before the curing is induced. After the curing is induced, by heat or a suitable radiation, the irreversible hardening occurs to the thermosetting polymer. The initial form of a thermosetting polymer is usually malleable or in a liquid state prior to curing. Thus, thermosetting polymers are considered as thermoplastic polymers prior to curing. The thermosetting polymers may include melamine formaldehyde, epoxy resin, polyester resin, polyurethane, and phenol formaldehyde resin.

Further, the elastomer is a type of polymer with viscoelastic properties. In general, elastomers are capable of recovering their original shape after being stretched or deformed. Yarns comprising an elastomeric core may provide flexibility, strain tolerance, and biasing and/or spring-like properties, among others. The elastomeric yarns may include, e.g., elastene, such as Lycra®, or nylon or polyamide materials.

Figure 3:
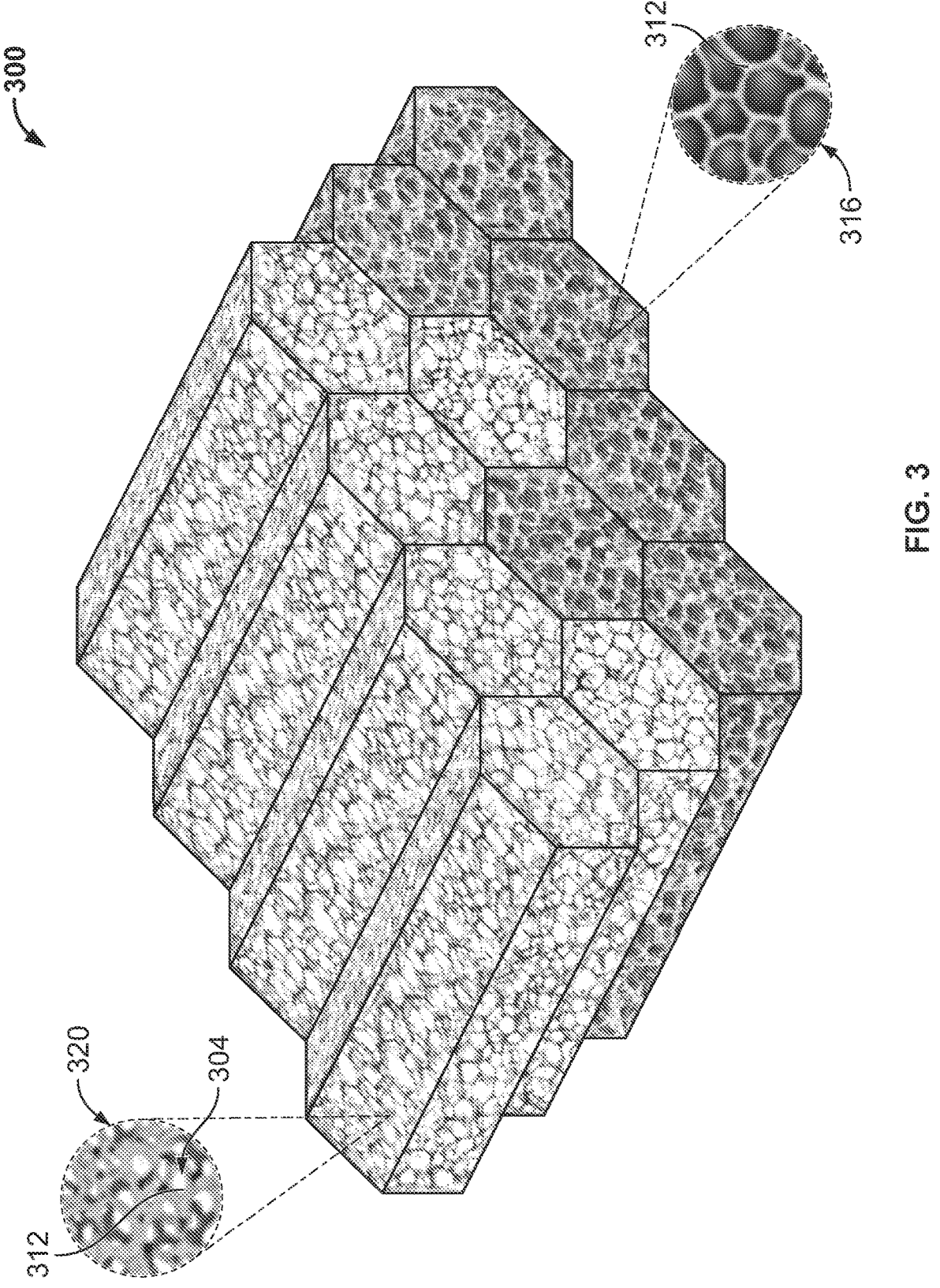
FIG. 3 is a diagram of a foam structure.

Referring to FIG. 3, a foam blank 300 is an object formed by trapping pockets of gas or a gas mixture in a liquid or a solid. The foam blank 300 includes a plurality of void structures 304 and a plurality of cell structures connected by a plurality of cell walls 312. The plurality of cell structures can be a closed-cell foam 316 or an open-cell foam 320. The closed-cell foam 316 is formed when discrete gas pockets are completely surrounded by solid material. The open-cell foam 320 is formed when gas pockets are interconnected to each other. The foam blank 300 may be formed from different polymers such as, e.g., thermoplastic polymers and thermosetting polymers. The foam blank 300 possesses favorable attributes such as, e.g., light weight, thermal insulation, high strength per unit weight, and high impact strength.

Figure 4:
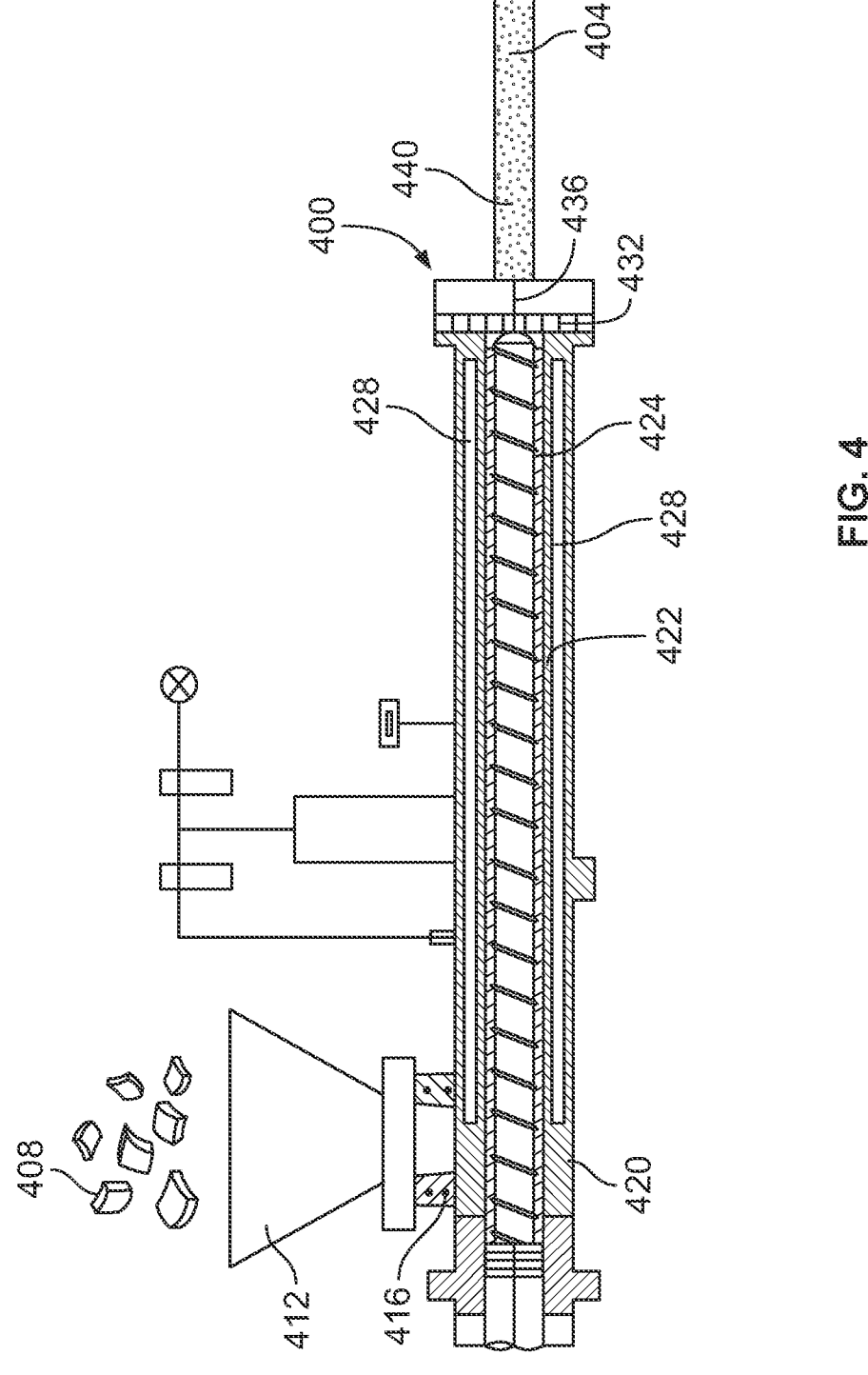
FIG. 4 is a manufacturing system for a strand of mono-yarn by an extrusion process.

As described herein, "a pellet," "a bead," "a flake," "a powder," and "a granule" are used interchangeably to refer to small particles comprising a polymer material. FIG. 4 depicts a system 400 of forming a single strand of polymer yarn 404 comprising a thermoplastic polymer core by extruding polymer pellets 408 with identical material properties. The strand of polymer yarn 404 may comprise at least one polymer core, such as a thermoplastic polymer core. The polymer pellets 408 are supplied from a hopper 412 into a barrel 416 of an extruder 420. The pellets 408 are gradually deformed and displaced along an interior wall 422 of the extruder 420 by the turning screws 424 therein and melted by the heaters 428 arranged along the extruder 420 to create a molten polymer. The molten polymer exits the screws 424 and travels through a breaker plate assembly 432 including a filtration media (not shown), such as a screen pack filter, for the removal of any contaminants in the molten polymer. After being passed through the breaker plate assembly 432, the molten polymer enters a die 436. The die 436 gives the polymer yarn 404 its shape and the polymer yarn exits the die as an extrudate 440. Subsequently, the polymer yarn 404 in the extrudate 440 form is cooled within a cooling trough (not shown). In some instances, composite polymer yarn may be created by combining and extruding polymer pellets 408 of different material properties.

A yarn structure described below may comprise any of the yarns described above, where the yarn 100 is a strand of monoyarn 108 or a multiple polymer yarn 200 comprising at least one thermoplastic polymer material core with varying properties such as, but not limited to material, diameter, denier, tear strength, and color. Multiple strands of yarns comprising the same or different characteristics may be manipulated to create a yarn structure.

The yarn structure may be a two-dimensional yarn structure or may be a three-dimensional yarn structure based on the structural configuration and the intertwinement of the yarn structure. The two-dimensional yarn structure does not extend in more than two directions. The two-dimensional yarn structure includes, but is not limited to, non-woven yarns, woven yarns, braided yarns, laced yarns, and knitted yarns that extend along a plane. The three-dimensional yarn structure extends in three directions regardless of whether the yarn structure is made in a single-step-process or a multiple-step-process. The three-dimensional yarn structure includes, but is not limited to, three-dimensional braided structures, over-braided structures, multi-layer weft-knits, spacer warp knits, and three-dimensional woven structures.

Figure 5:
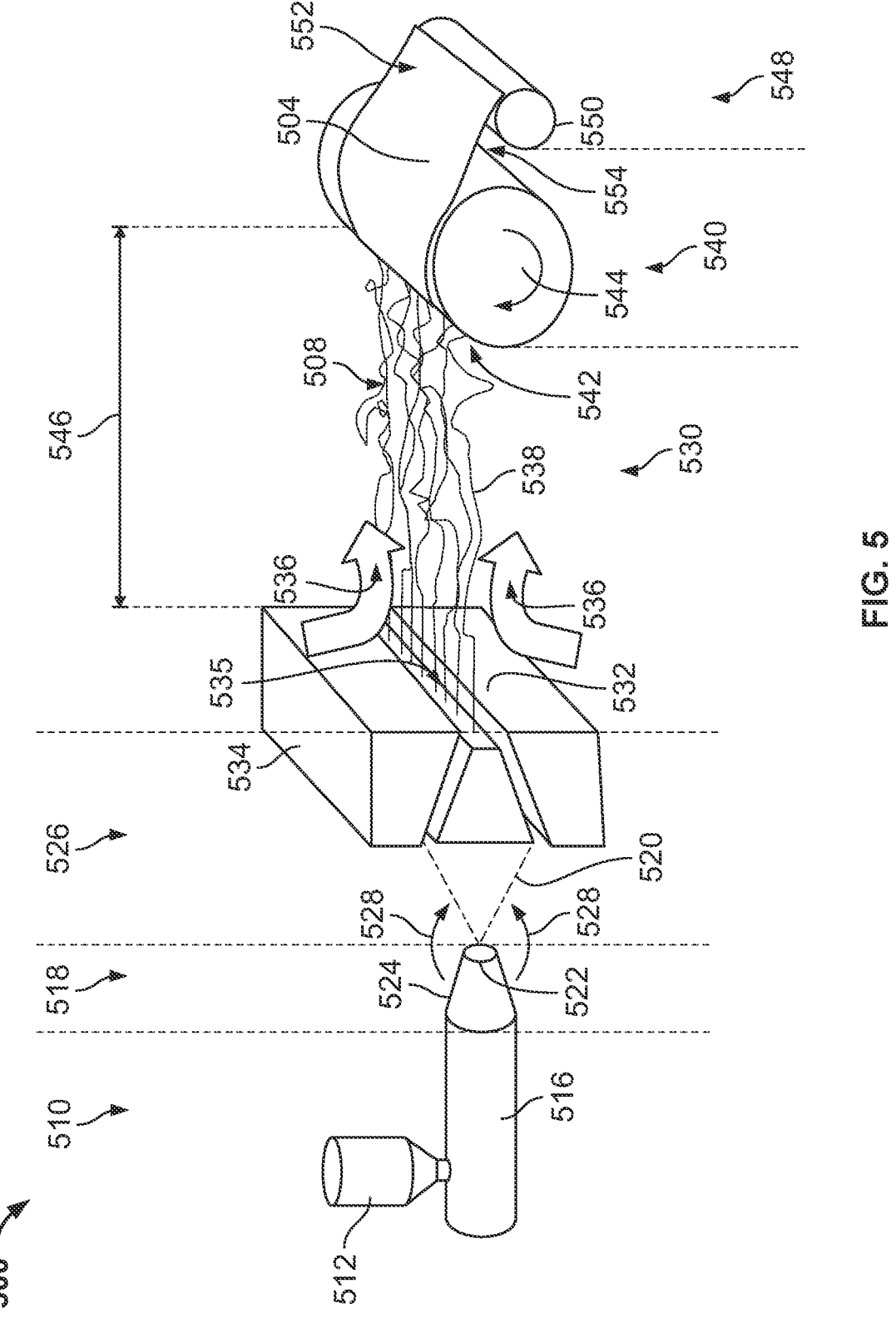
FIG. 5 is a schematic representation of a manufacturing process for a non-woven yarn.

FIG. 5 depicts a melt blowing process 500 for manufacturing a nonwoven yarn 504. The melt blowing process 500 converts raw materials into a web structure 508. The first step 510 includes the process of supplying a low viscosity raw material (not shown) into a hopper 512 to be melted and extruded through an extruder 516, which may be similar to the extruder 420 of FIG. 4. The second step 518 includes the process of forming an extruded filament 520 from the molten raw material passing through a feeding die hole 522 in a spinneret 524. During the third step 526, the extruded filaments 520 are directed by primary air streams 528 toward a die 534. The primary air streams 528 are blown at a high velocity and elevated temperature to push the extruded filament 520 emerging from the spinneret 524 rapidly and without cooling. The temperature of the primary air stream 528 can be measured by a thermocouple (not shown) and the temperature of the primary air stream 528 is approximately equal to or greater than the temperature of the molten raw material of the extruded filament 520. The extruded filament 520 and the primary air stream 528 converge within the die 534 to form a fiber stream 532 and exit through an outlet 535 of the die 534. During the fourth step 530, a secondary air stream 536, which has a lower temperature relative to the primary air stream 528, is applied to the fiber stream 532 to form a plurality of fibers 538. The secondary air stream 536 may be generated from ambient air and may be applied in a turbulent manner. During the fifth step 540, the plurality of fibers 538 are received by a receiving side 542 of a collector or netting machine 544. A die-to-collector distance 546 is defined between the outlet of the die 534 and the receiving side 542 of the collector 544. The collector 544 is positioned downstream of the outlet 535 of the die 534. The collector 544 may be provided as a roller, such as, e.g., a calender roller or a rotating drum. The collector 544 forms the web structure 508 by distributing and/or spreading the plurality of fibers 538 along the collector 544. During the sixth step 548, the web structure 508 is transferred onto a winding machine 550 that winds the web structure 508 to form the nonwoven yarn 504. The web structure includes a die-side 552 that is the outer side of the web structure 508 and a collector side 554 that is the inner side of the web structure 508. The properties of the web structure 508 are controlled by the selection and combination of several process variables of the melt blowing process 500, such as, e.g., a polymer melt temperature, polymer throughput rate, primary air temperature, primary air flow rate, and die-to-collector distance. The aforesaid process variables determine the morphology and shape, e.g., diameter, of the plurality of fibers 538 that form the nonwoven yarn 504. For example, increasing the die-to-collector distance 546 allows for a greater span over which the plurality of fibers 538 become entangled by exposure to the secondary air 536, which results in increased fiber entangling to provide bulkier and softer web structures. Further, the die-to-collector distance 546 may be increased to avoid fiber laydown irregularities, e.g., bunching or chunking, of the plurality of fibers 538 as they become entangled and collected. Also, increasing the die-to-collector distance 546 extends the duration over which the plurality fibers 538 are exposed to ambient air and/or the secondary air stream 536 to result in improved fiber cooling. By contrast, reducing the die-to-collector distance 546 results generally in reduced fiber entangling, stiffer web structures, and uniform web structures with improved barrier properties.

Figures 6A, 6B, 6C:
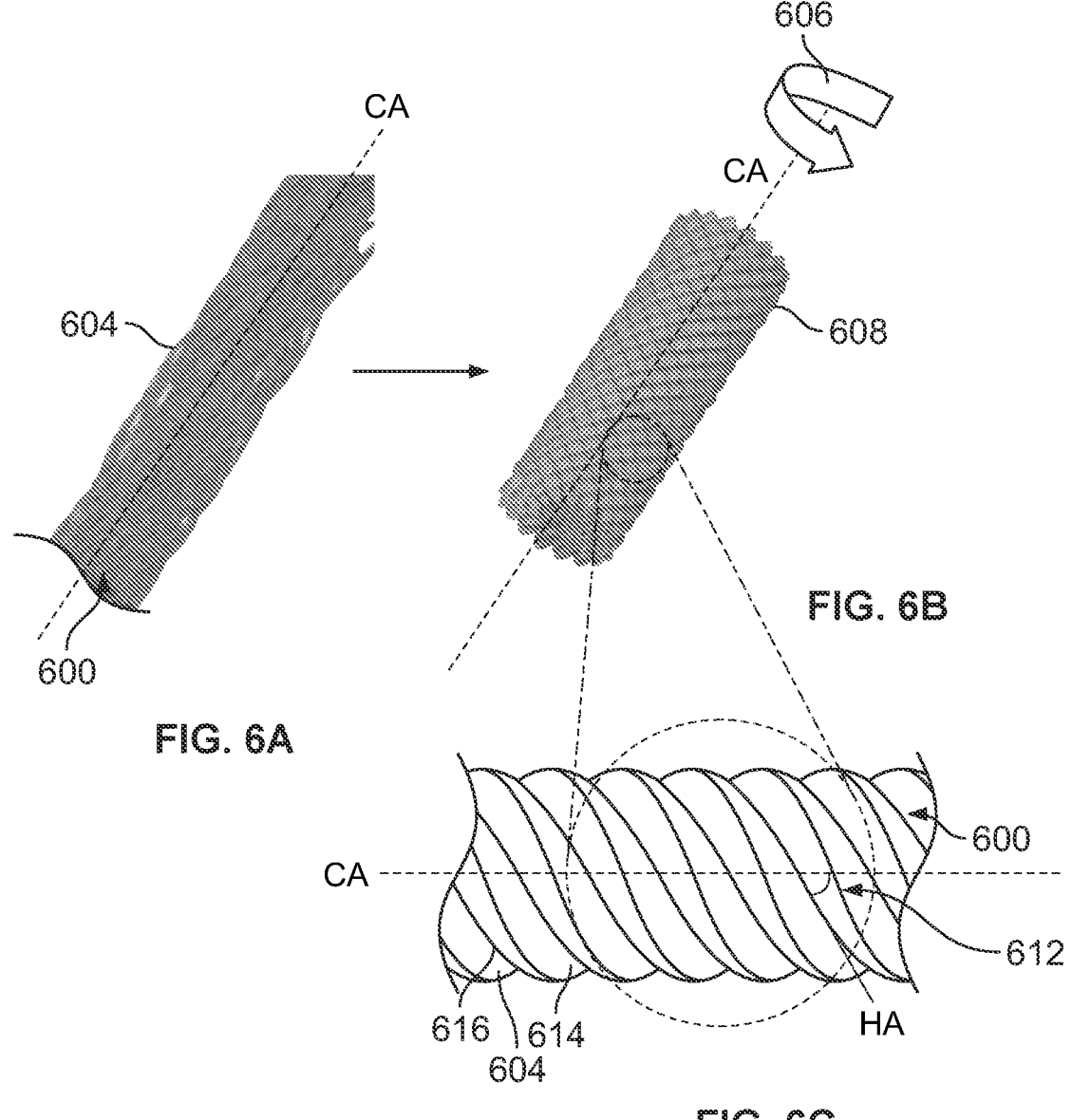
FIG. 6A is a perspective view of a portion of a bundle of yarn, the yarn being in an untwisted configuration.
FIG. 6B is a perspective view of a bundle of yarn in a twisted configuration.
FIG. 6C is an enlarged view of a portion of the bundle of yarn in a helical twist configuration.

Turning to FIGS. 6A-6C, and with particular reference presently to FIG. 6A, a bundled yarn 600 may be formed from a plurality of yarns 604 arranged along the central axis CA. The plurality of yarns 604 may comprise different material properties, as described above and herein. FIG. 6B depicts the plurality of yarns 604 twisted in a counterclockwise direction 606 to form a twisted yarn structure 608. The twisted yarn structure 608 that is twisted counter-clockwise is known as an S-twist yarn. In some embodiments, the plurality of yarns 604 may be twisted in a clockwise direction forming a Z-twist yarn. The twisted yarn structure 608 may be provided in a variety of configurations and may take alternative forms other than those shown herein. For example, more than one strand of monoyarn 108 shown in FIG. 1 comprising a single thermoplastic polymer core may be bundled to form the bundled yarn 600 of the plurality of yarns 604. Specifically referring to FIG. 6C, the plurality of yarns 604 is twisted under axial tension applied along a central axis CA that is centrally disposed among the plurality of yarns 604 and extends through opposing ends thereof along a longitudinal direction of the twisted yarn structure 608. The plurality of yarns 604 may be twisted, either clockwise or counterclockwise, such that each yarn 614 of the plurality of yarns 604 defines a helical axis HA that is disposed at a helical angle 612 relative to the central axis CA, as shown in FIG. 6C. Each yarn 614 forms a helix structure 616, which is defined by the helical angle 612. The helical angle 612 of the helix structure 616 created by the twisted yarn 600 may be between at least 10 degrees and at least 80 degrees, at least 20 degrees and at least 70 degrees, at least 30 degrees and at least 60 degrees, or, in some examples, about 45 degrees. Each yarn 614 may have a helical angle 612 that is uniform or may have one or more helical angles 612 that are different from one another. As a solvent or a blowing agent is impregnated into the twisted yarn structure 608 to form a multicellular foam structure, an orientation of a cell growth direction, relative to the central axis CA and the longitudinal direction, provides anisotropic properties to the foam structure. The foam structure may include unidirectional cell growth, bidirectional cell growth, and radial cell growth. In some embodiments, the cell growth direction may be at least one of perpendicular to, parallel with, or angled from the longitudinal direction of the central axis CA. In some embodiments, there are multiple cell growth directions that differ from one another, such as, e.g., a first cell growth direction that is perpendicular to the central axis CA and a second cell growth direction that is not perpendicular to the central axis CA. The cell growth direction incorporated with the different intertwinements of the yarn structures provides unique anisotropic characteristics.

Figure 7E:
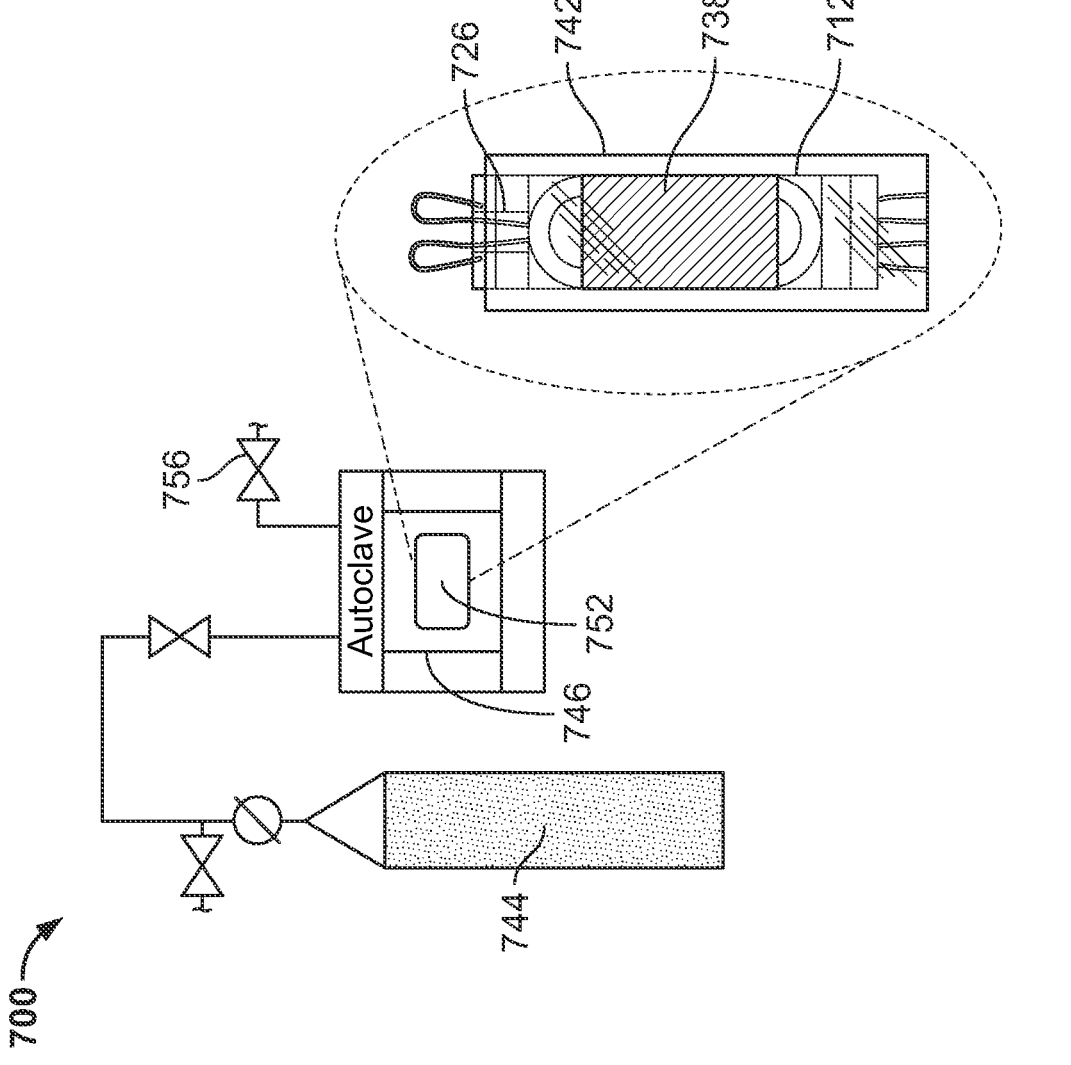
FIG. 7E is a fifth step in a sequence of fabricating a twisted yarn with controlled pitch and tension.

Referring to FIGS. 7A-7E, a method 700 of twisting a yarn structure under controlled rotation and controlled tension is disclosed. Specifically referring to FIG. 7A, a first stiff wire 704 and a second stiff wire 706 are used to hold a bundle of yarn 708 at each end. It will be appreciated that the bundle of yarn 708 is depicted in a simplified manner for illustrative purposes and may be configured in various forms and shapes. Referring to FIG. 7B, the bundle of yarn 708 is placed within a tubular reservoir 712. The tubular reservoir 712 includes opposing ends each comprising an opening 714. Referring to FIG. 7C, both ends of the tubular reservoir 712 are configured to receive a septum or plug 716. A first septum 718 includes an aperture 720 that allows the first stiff wire 704 to be threaded therethrough to form loops outside of the tubular reservoir 712. A second septum 722 includes a larger aperture 724 to accommodate for a small cut test tube 726, where the second stiff wire 706 passes through the small cut test tube 726. The second stiff wire 706 defines a fixed end 728 and the first stiff wire 704 defines a twisting end 730 having loops to which a weight 734 is attached to apply axial tension to the bundle of yarn 708. Referring to FIG. 7D, with the weight 734 attached, the bundle of yarn 708 is twisted under controlled rotation and tension. Referring to FIG. 7E, after the bundle of yarn 708 is twisted a desired degree, which may be measured in units of radians or angular degrees, the weight 734 is removed, and a bundle of twisted yarns 738 is covered by an aluminum foil 742, which is depicted as being translucent for illustrative purposes. A solvent 744, such as styrene, is injected into the tubular reservoir 712 through the small cut test tube 726 to saturate and coat the bundle of twisted yarns 738. Subsequently, the tubular reservoir 712 containing the solvent 744 and twisted yarns 738 is disposed in an autoclave or reactor 746 for initiating the foaming process, which includes controlled applications of temperature and pressure, such as, e.g., exposure to elevated temperatures and pressures for predetermined periods of time, which may occur in one or more cycles. The foam blank 752 is formed through depressurization by releasing the pressure through a control valve 756.

Figure 8C:
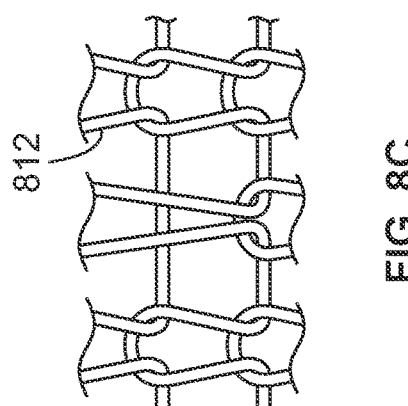
FIG. 8C is a top plan view of yet another knitted yarn structure.
Figure 8F:
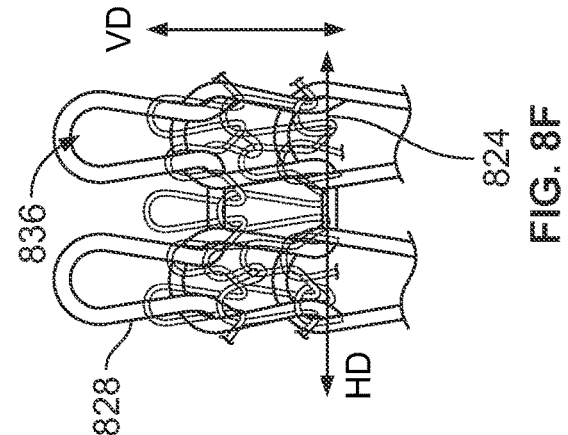
FIG. 8F is a top plan view of yet another knitted structure.
Figure 8B:
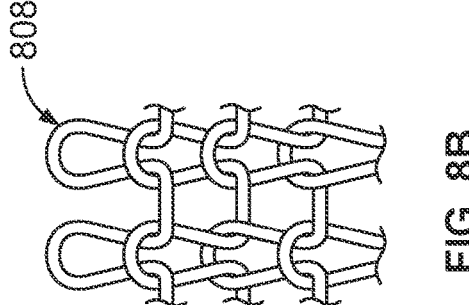
FIG. 8B is a top plan view of another knitted yarn structure.
Figure 8E:
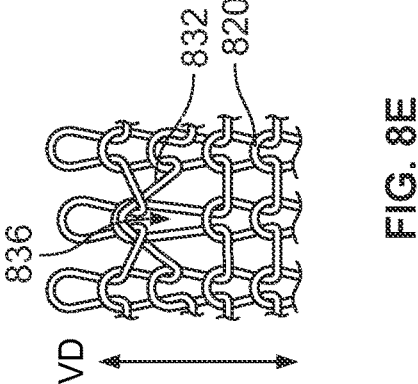
FIG. 8E is a top plan view of another knitted yarn structure.
Figure 8A:
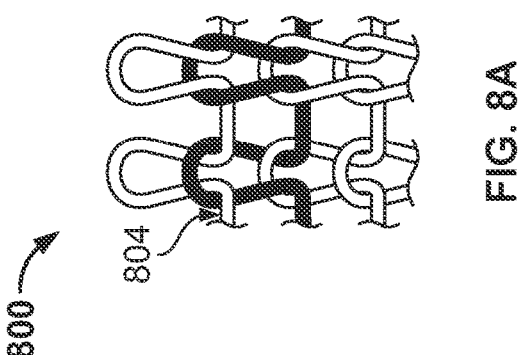
FIG. 8A is a top plan view of a knitted yarn structure.
Figure 8D:
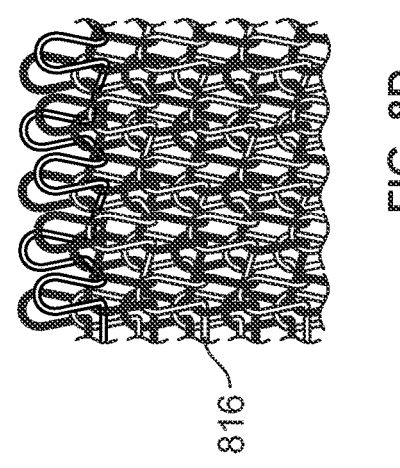
FIG. 8D is a top plan view of still another knitted yarn structure.

In some embodiments, the yarns may be knitted to manipulate the yarn structure. The knitted yarn structure may be formed by intermeshing yarns to form loops and, thus, the knitted yarn structure can be provided in a variety of configurations. The knitting process entangles the yarns in such a way that they run parallel to each other. The knitting process can be varied according to several parameters, such as, e.g., direction of loop formation, density of loop formation, and variance in loop shape, among other aspects. FIGS. 8A-G depict stitching configurations of knitted yarn structures 800. FIG. 8A shows a rib stitch 804. FIG. 8B shows a purl stitch 808. FIG. 8C shows a welt stitch 812. FIG. 8D shows an interlock stitch 816. FIG. 8E shows a tuck stitch 820. FIG. 8F shows a plain stitch 824. Accordingly, different stitching configurations, combinations, and materials, may be applied to different layers to impart a variety of properties to each of the layers.

In general, weft knitting 828 and warp knitting 832 are the two primary methods by which the yarn can be subjected to the needles for knitted yarn structure formation. As illustrated in FIG. 8F, the weft knitting method 828 is accomplished by forming a plurality of loops 836 using a needle (not shown) along a horizontal direction HD. In the weft knitting method 828, the plurality of loops 836 are formed from a single, common yarn along the horizontal direction HD and arranged in rows sequentially by using particular needling patterns. The weft knitting method 828 can be accomplished using a circular knitting machine or a flatbed machine. Referring to FIG. 8E, the warp knitting method 832 is accomplished by forming loops in a vertical direction VD. The yarn is intermeshed vertically along the vertical direction VD and the plurality of loops 836 are created from the combination of several, distinct yarns arranged lengthwise along the vertical direction VD and oriented parallel to each other. The warp knitting method 832 can be accomplished using a raschel machine.

Figure 8G:
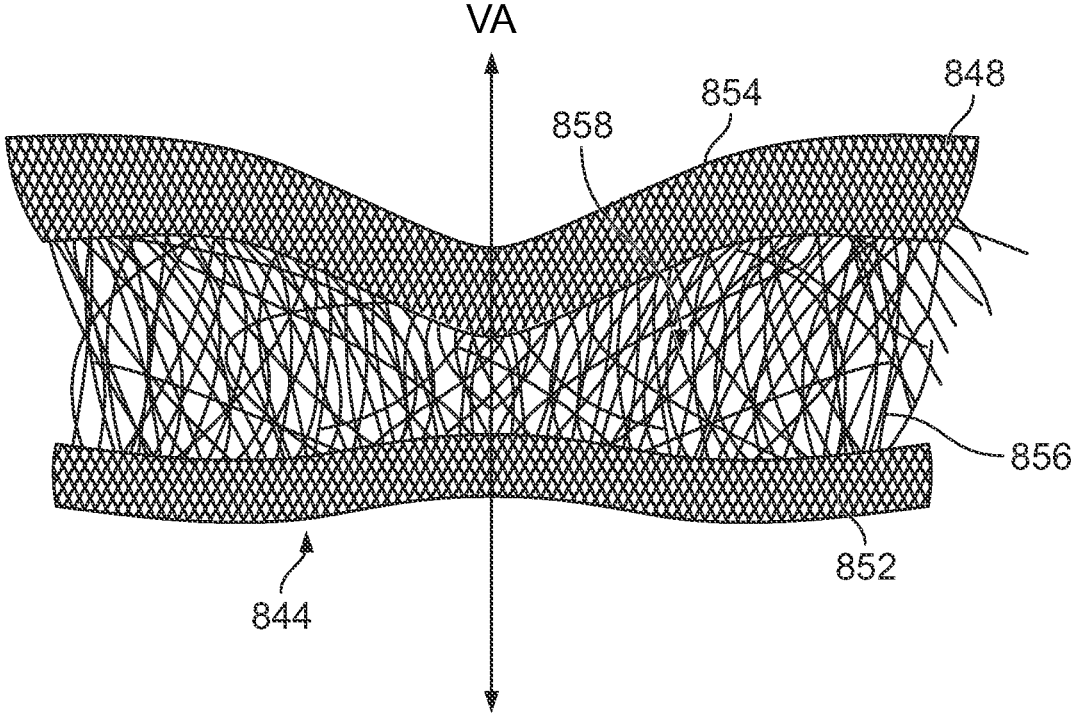
FIG. 8G is a top plan view of still another knitted structure.

In some embodiments, referring to FIG. 8G, a spacer knit 844 may be used to create a super lightweight yarn structure. The spacer knit 844 comprises a first substrate layer 848 and a second substrate layer 852. The first substrate layer 848 and the second substrate layer 852 comprise a plurality of weft yarn and/or warp yarn structures to form a surface 854. A plurality of spacer yarns 856 is placed vertically along a vertical axis VA between the first substrate layer 848 and the second substrate layer 852 creating a plurality of air traps 858. The surface 854 of the first substrate layer 848 and/or the second substrate layer 852 may be knitted into different structures, such as, e.g., a hexagonal mesh or a chain mesh, to manipulate the orientation of the plurality of spacer yarns 856 along the weft direction (shown in FIG. 9) or the warp direction (shown in FIG. 9). The orientation relative to the vertical axis VA can be manipulated to vary the shrinkage strain of the plurality of spacer yarns 856.

Figure 9:
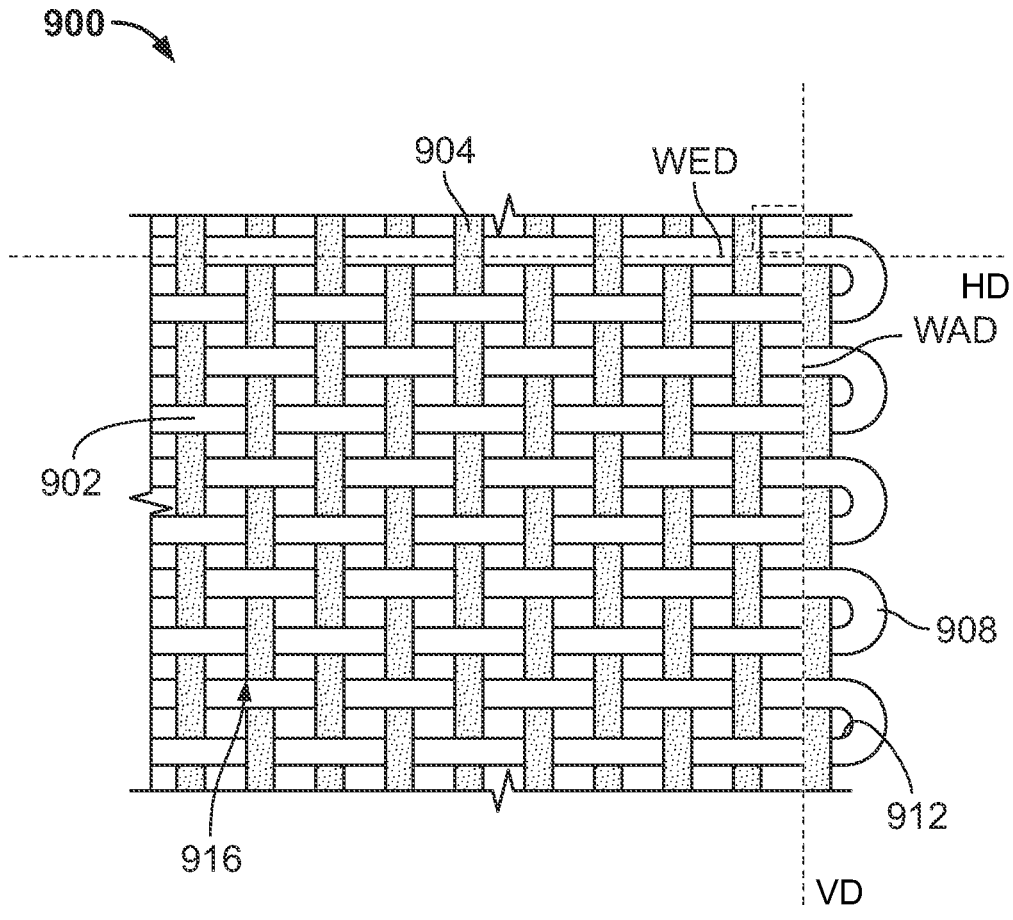
FIG. 9 is a top plan view of a woven yarn structure.

Turning to FIG. 9, the monoyarn 108 (see FIG. 1) or multiple polymer yarns 200 (see FIG. 2) may be woven to form a woven yarn structure 900. The woven yarn structure 900 may be provided in a variety of configurations and may take alternative forms than those shown and described herein. The yarns arranged in the horizontal direction HD or the weft direction WED are called a weft yarn 902. The yarns arranged in the vertical direction VD or the warp direction WAD are called a warp yarn 904. The weft yarns 902 wrapped around the warp yarns 904 that create an edge 908 of the fabric are called a selvedge 912. In some embodiments, a weaving method comprises two distinct sets of yarns that are interlaced perpendicularly to form the woven yarn structure 900. As such, the two distinct sets of yarns are interwoven to create a plain weave structure, a satin weave structure, or a twill weave structure. In this way, the weaving process orients the yarns in a perpendicular crisscross pattern 916 and enables the woven yarn structure 900 to maintain a thin profile but also limits the stretchability of the woven yarn structure 900.

In some embodiments, the yarns may be woven by weaving machines (not shown), such as, e.g., a shuttle type, a circular type, or a narrow type. The shuttle weaving machines are generally controlled electronically and are configured to weave tight warp and weft patterns. The shuttle type weaving machines comprise a narrow piece of wood or plastic with notches on the end to hold the yarn and is automatically moved back and forth between the vertical warp threads to weave through the horizontal weft threads. The conventional circular type weaving machines comprise two or more shuttles moving simultaneously in a circle to weave the weft threads in a section of the warp threads and is generally controlled electronically. The mechanics of the electronic weaving machines may vary but the underlying principles for creating a woven structure are the same. A non-electric, hand-operated machine may be used for weaving, such as a loom. The loom is a device that is used to weave by holding the warp yarns under tension to facilitate the interweaving of the weft threads. The orientations or the shape of various looms may differ, but the basic function is the same.

In some embodiments, the knitted yarn structures 800 of FIGS. 8A-G or the woven yarn structures 900 of FIG. 9 may comprise different properties by use of varying materials, varying yarn thickness, or varying colors. The different properties may include, e.g., yarn count, twist in yarn, yarn strength, torsional properties, elongation, elasticity, tear strength, and flexural properties.

Figures 10A, 10B, 10C:
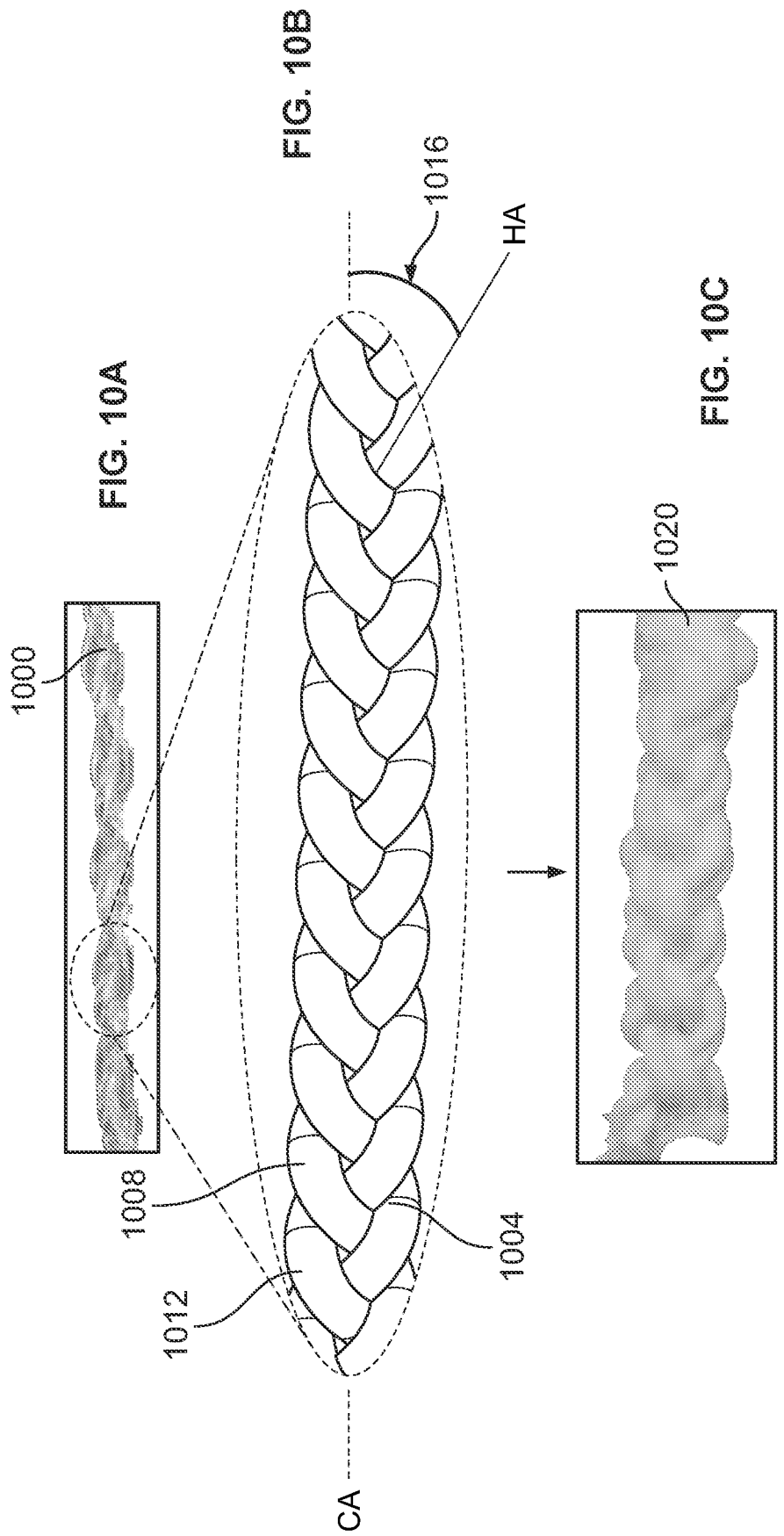
FIG. 10A is a top view of a braided yarn prior to foaming.
FIG. 10B is a top enlarged view of a braided yarn prior to foaming.
FIG. 10C is a top view of a braided yarn after foaming.

Referring to FIGS. 10A-C, multiple strands of yarns may be braided to form a braided yarn structure 1000. Referring to FIG. 10A, the braided yarn structure 1000 may be provided in a variety of configurations and may take alternative forms than those shown herein. The braided yarn structure 1000 consists of a first yarn 1004, a second yarn 1008 and a third yarn 1012. Referring to FIG. 10B, the first yarn 1004 goes over the second yarn 1008 and under the third yarn 1012. The third yarn 1012 is passed over the adjacent yarn. In the illustrated embodiment, the first yarn 1004 is passed under the second yarn 1008. The yarns 1004, 1008, 1012 are braided continuously along the central axis CA, which allows the braided yarn structure 1000 to more evenly distribute a tensile load. The braids are defined by a braided angle 1016, which may be described as an angle between the central axis and a helical axis HA. The helical axis HA is defined by the helical intertwinement of the continuous yarn structure. Referring to FIG. 10C, the braided yarn structure may be foamed by a supercritical $CO_2$ foaming process to form a foamed braided yarn structure 1020. The supercritical $CO_2$ foaming process occurs by a diffusion and solubilization of $CO_2$ molecules within the braided yarn structure material at supercritical conditions, and a sudden decrease in pressure that allows the formation of $CO_2$ bubbles within the material.

In some embodiments, the two-dimensional braided structure comprises axial yarns along the axial loading direction and braider yarns diagonal to the axial yarns creating different braid structures. The two-dimensional braided structures may be linear, product curved, or plane shell. Different braid structures such as, but not limited to, regular braid, diamond braid, and Hercules braid can be created at braided angles 1016 that are different. A diagonally interlacing braided angle 1016 may be at least 1 degree, at least 10 degrees, at least 20 degrees, at least 30 degrees, at least 40 degrees, at least 50 degrees, at least 60 degrees, at least 70 degrees, at least 80 degrees, or at least 89 degrees. Most braided angles 1016 range between 30 degrees to 80 degrees from the central axis CA. The central axis CA is the direction of which the braided yarn structure 1000 is formed.

As described herein, "a circular braid," "a round braid," or a "tubular braid" are used interchangeably to refer to a braided structure formed around a circular profile. Accordingly, the braided structure 1000 of FIG. 10 may be used to interlace the yarns together to form the circular braid, according to known methods. At the same time, the braided structure can be produced using the circular braid while maintain all the braided yarns under axial tension. In some embodiments, the axial tension may be varied or fluctuated, or the axial tension may be maintained at a constant level, for periods of time or throughout the entire process. For hand braiding yarns of relatively short lengths, an individual may use a weight to apply and/or adjust the tension on the yarns by adding or removing the weights, as desired. In some embodiments, the yarns are arranged about a core or mandrel and are braided in a linear fashion, e.g., from a top end to a bottom end. This hand braided method is known as Maypole braiding and the principle is used for over-braiding of different structural profiles.

Referring to FIGS. 11A-F, Kumihimo braiding 1100 may be used to form tubular braids. Kumihimo braiding 1100 utilizes Kumihimo disks 1104 made from a firm, dense foam with a plurality of notches 1106 around the peripheral edge 1108, which allows for the creation of the necessary tension to braid yarns. The Kumihimo disk 1104 is typically made in a circular disk shape that allows braiding of tubular braiding profiles, but the Kumihimo disks 1104 may be rectangular shaped or square shaped, which afford the braider the ability to create flat braids.

Figure 11A:
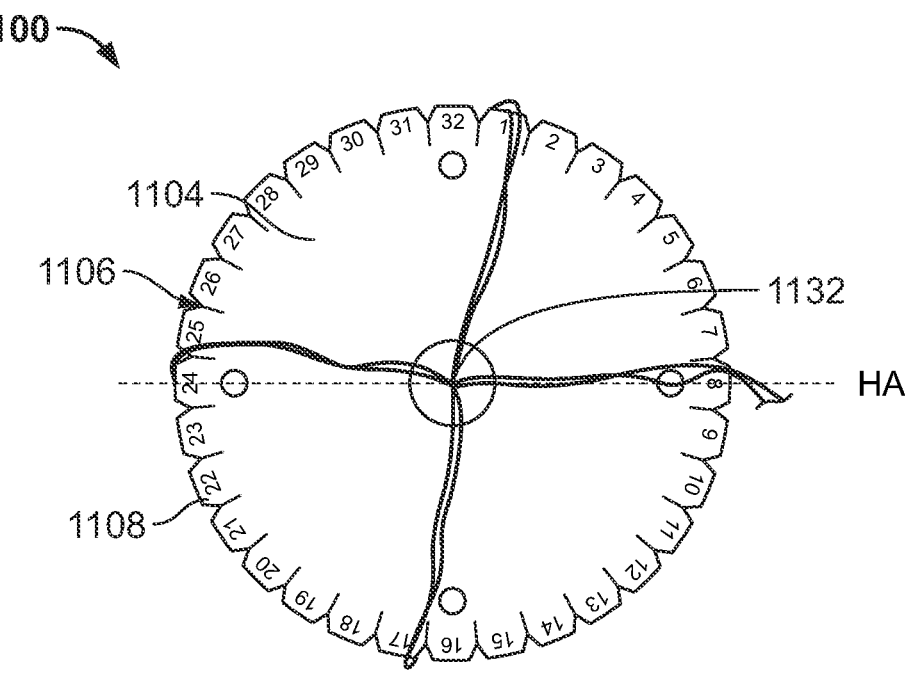
FIG. 11A is a first step in a sequence of Kumihimo braiding.
Figure 11B:
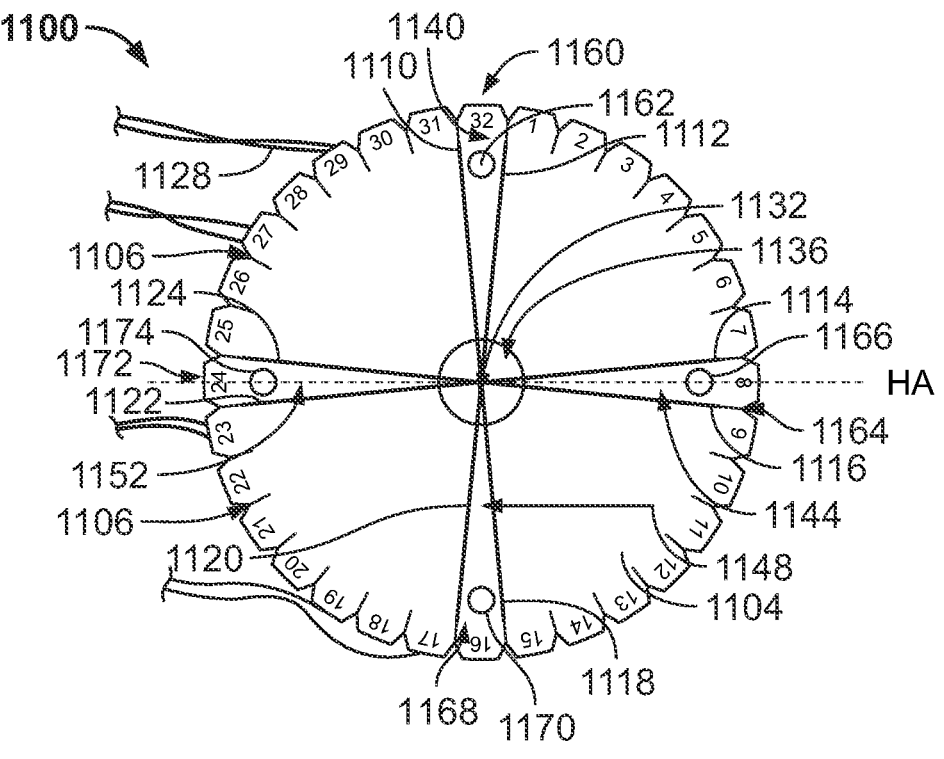
FIG. 11B is a second step in a sequence of Kumihimo braiding.
Figure 11C:
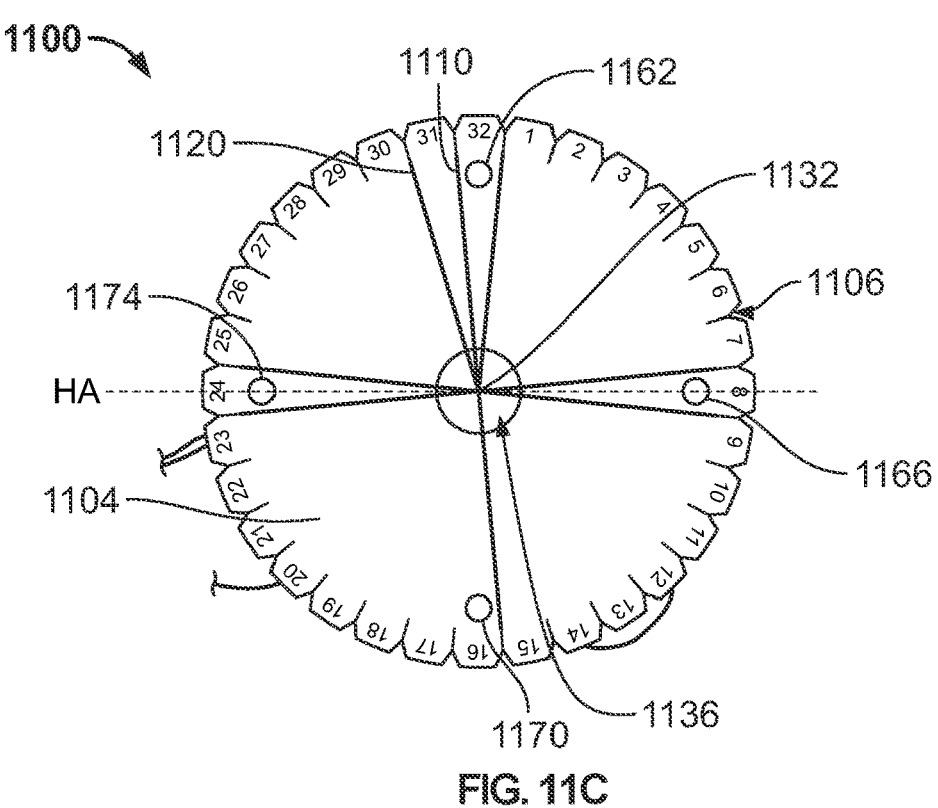
FIG. 11C is a third step in a sequence of Kumihimo braiding.
Figure 11D:
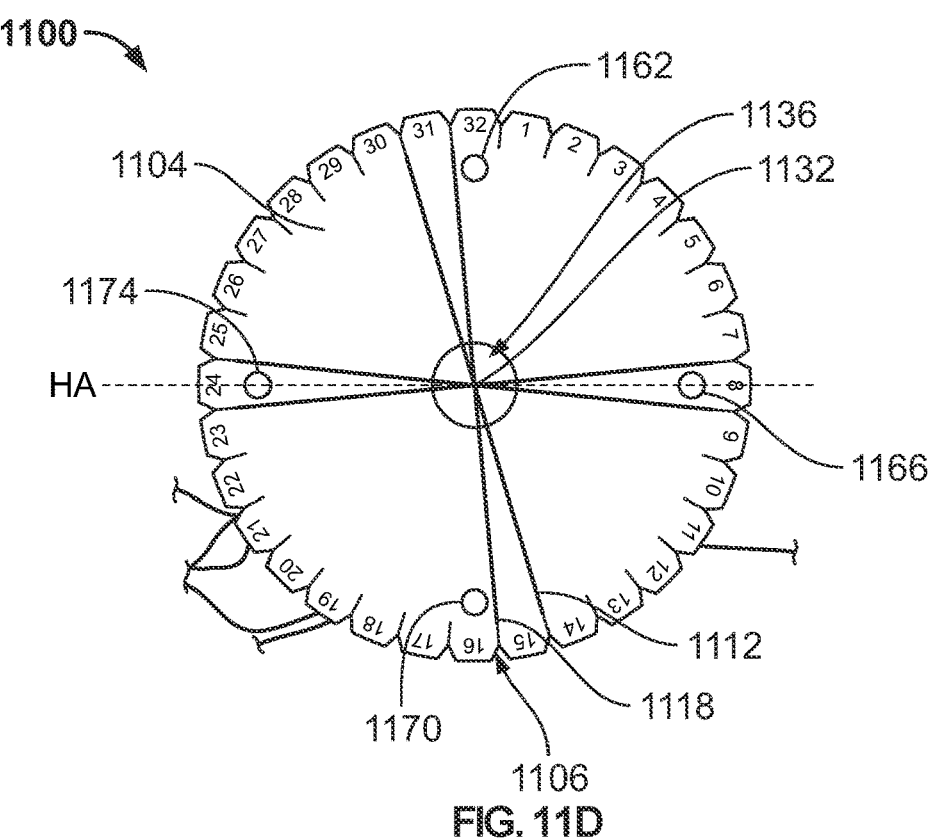
FIG. 11D is a fourth step in a sequence of Kumihimo braiding.
Figure 11E:
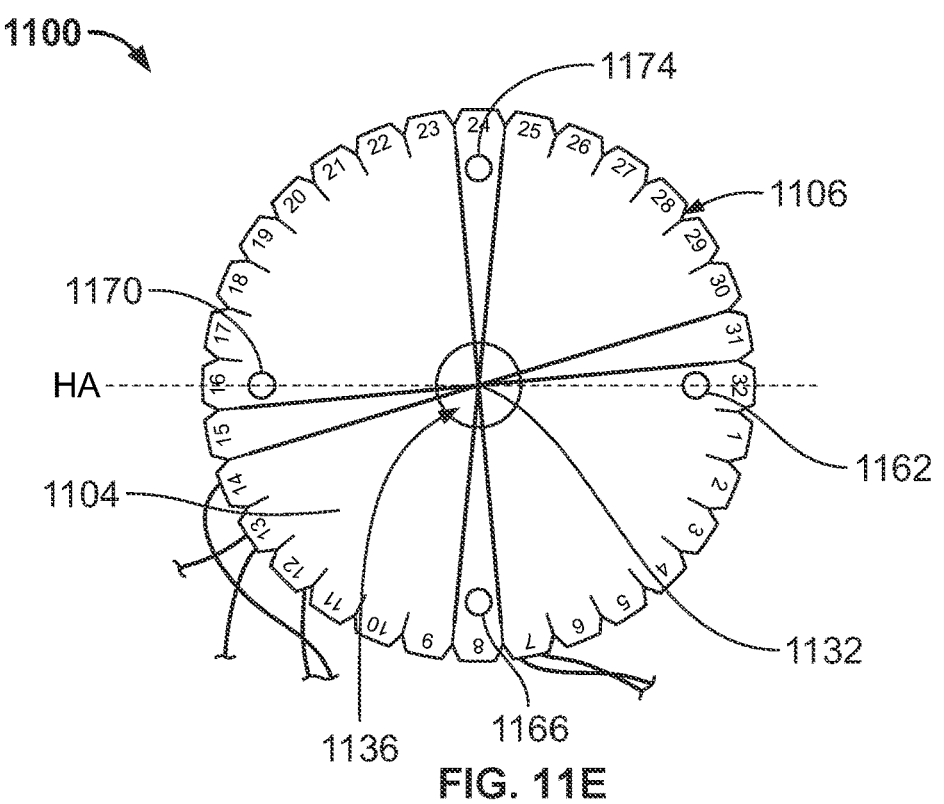
FIG. 11E is a fifth step in a sequence of Kumihimo braiding.
Figure 11F:
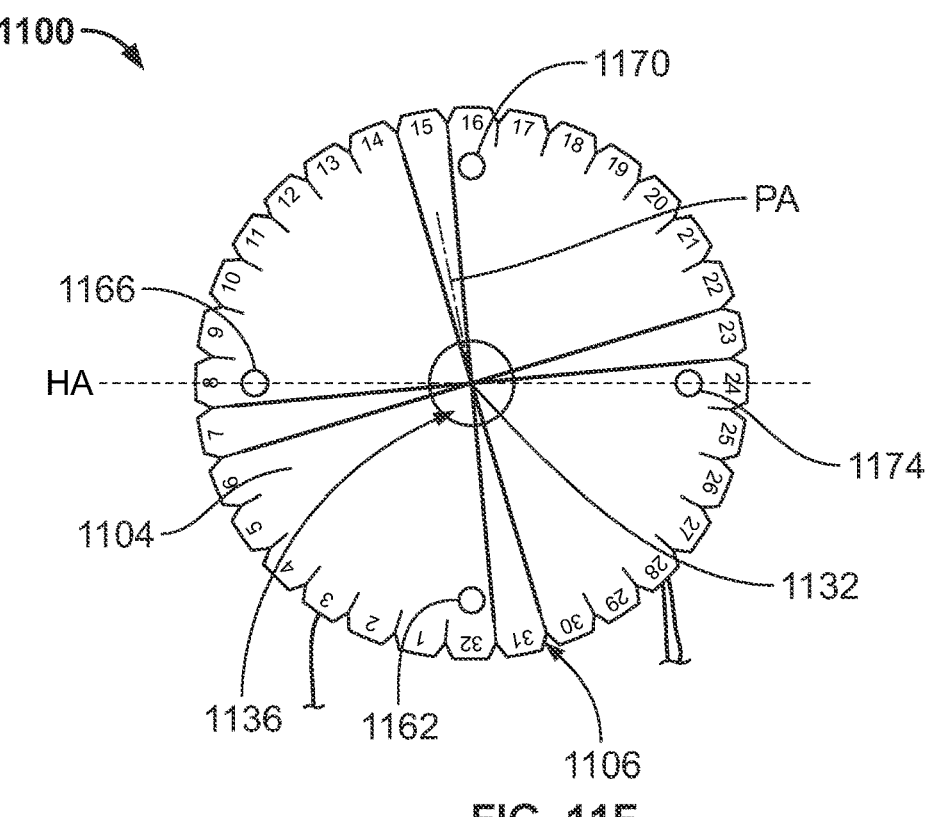
FIG. 11F is a sixth step in a sequence of Kumihimo braiding.
Figures 12A, 12B, 12C, 12D:
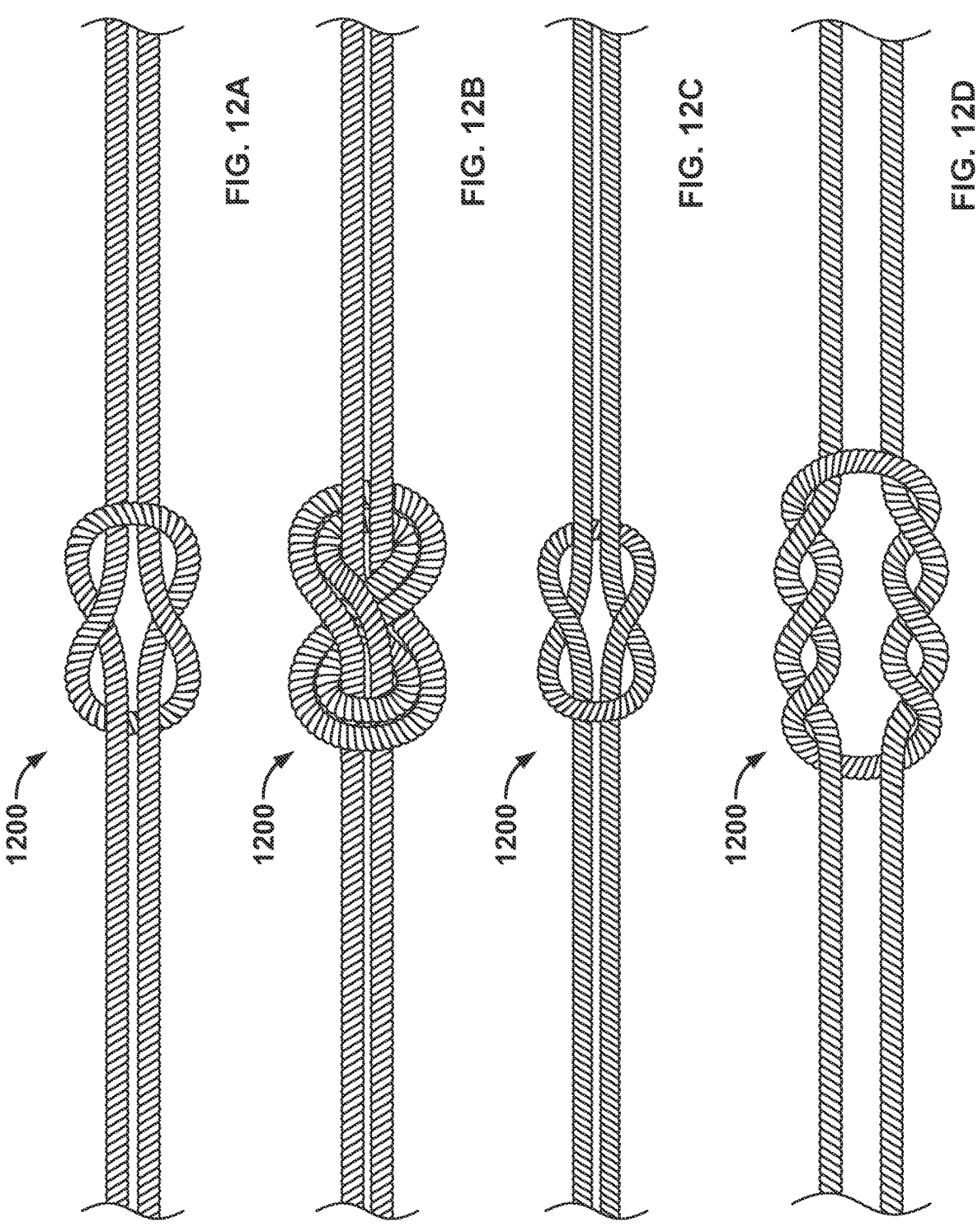
FIG. 12A is a top plan view of a knot.
FIG. 12B is a top plan view of another knot.
FIG. 12C is a top plan view of yet another knot.
FIG. 12D is a top plan view of still another knot.

Referring to FIG. 11A, eight (8) strands of yarn will be tied together by a knot at one end, or a bobbin (not shown) may be used to hold the yarn together and prevent tangling. In some embodiments, a weight (not shown) may be tied to the knot to apply tension to the yarn in a direction that is perpendicular to a horizontal axis HA defined by the Kumihimo disk 1104. Referring to FIG. 11B, in Kumihimo braiding 1100, a first yarn 1110, a second yarn 1112, a third yarn 1114, a fourth yarn 1116, a fifth yarn 1118, a sixth yarn 1120, a seventh yarn 1122 and an eighth yarn 1124 are placed within the plurality of notches 1106 around the peripheral edge 1108, which is referred to as a warp 1128. The Kumihimo disk 1104 in the present disclosure includes 32 notches and 8 strands of yarns. A knot 1132 is placed into a center hole 1136 on the Kumihimo disk 1104 and the 8 stands of yarn are separated into four subgroups with two strands each. For example, a first subgroup 1140 includes the first and second yarns 1110, 1112, a second subgroup 1144 includes the third and fourth yarns 1114, 1116, a third subgroup 1148 includes the fifth and sixth yarns 1118, 1120, and a fourth subgroup 1152 includes the seventh and eighth yarns 1122, 1124. The first subgroup 1140 is retained by notches 1106 located at a first position 1160 adjacent to first dot 1162, the second subgroup 1144 is retained by notches 1106 located at a second position 1164 adjacent to second dot 1166, the third subgroup 1148 is retained by notches 1106 located at a third position 1168 adjacent to third dot 1170, and the fourth subgroup 1152 is retained by notches 1106 located at a fourth position 1172 adjacent to fourth dot 1174. For example, the first subgroup 1140 comprising the first yarn 1110 and the second yarn 1112 at the first position 1160 is retained within the notches adjacent to the first dot 1162. The first yarn 1110 is retained within the notch located at a left side of the first dot 1162 and the second yarn 1112 is retained within the notch located at a right side of the first dot 1162. Referring to FIG. 11C, with the first dot 1162 facing upward and the third dot 1170 facing downward, the sixth yarn 1120 retained within the notch 1106 located at the left side of third dot 1170 is moved directly across the horizontal axis HA of the disk and is retained within notch located at the left side of the first yarn 1110 located at the left side of the first dot 1162. Referring to FIG. 11D, the second yarn 1112 located at the right side of the first dot 1162 is moved directly across the horizontal axis HA of the disk to the notch 1106 located at the right side of the fifth yarn 1118. Referring to FIG. 11E, the Kumihimo disk 1104 is rotated clockwise with a quarter turn, making the fourth dot 1174 face upward, and the second dot 1166 face downward. The braiding process of FIGS. 11C and 11D is repeated by moving the bottom left most yarn across the horizontal axis and placing it adjacent to the top left most yarn and moving the top right most yarn across the horizontal axis and placing it adjacent to the bottom right most yarn to form the braided structure 1000 of FIG. 10 along a product axis. The product axis PA extends perpendicular to the Kumihimo disk 1104. Referring to FIG. 11F, the Kumihimo disk 1104 is rotated again in a clockwise direction with a quarter turn and the braiding process of FIGS. 11C and 11D is repeated.

In some embodiments, the braided profile may be created by a braiding machine such as, but not limited to, a horn gear braider, a maypole braider, a square braider, a Wardwell rapid braider, and a high-speed programmable logic controller braider. The general working process of braiding machines starts with the strands of yarn being wound onto the bobbin, the bobbin being mounted onto a carrier, and the carrier being mounted onto the braiding machine to generate the braided profile.

In some embodiments, the braided profile may comprise different characteristics such as, but not limited to, different materials, thicknesses, and colors. The materials may comprise different polymeric cores with different mechanical properties such as frictional properties, flexural properties, tensile properties, torsional properties, moduli of elasticity, breaking extensions, plasticity, elastic limits, breaking points, and elongation. For example, three strands of yarn comprising different properties may be used to form the braided yarn structure 1000. The first yarn may comprise a thicker diameter than the second yarn and/or the third yarn. The second yarn comprises a different material in comparison to the first yarn and/or the third yarn. The third yarn comprises the same type of material as the first yarn but has a different diameter. As such, different yarns may be braided to create a yarn profile based on the application of the braided yarn structure 1000.

Referring to FIGS. 12A-D, sections of yarn, such as the twisted yarn structure 608, knitted yarn structure 800, and braided yarn structure 1000, can be extended by fastening to adjacent sections of yarn with a knot 1200. The knot 1200 may include any of a variety of well-known knot configurations, including a double fisherman's knot, an Eskimo bowline knot, a double figure-eight knot, a fisherman's knot, a half hitch knot, a Kalmyk loop knot, an overhand knot, an overhand loop knot, a reef knot, a thief knot, a square knot, a plafond knot, and a friendship knot. In some embodiments, the outer layer(s) of the knot 1200 may be thermo-pressed at certain temperatures and/or pressures to permanently or semi-permanently maintain the shape.

As used herein, "a foaming agent," "a solvent," "a pneumatogen," or "a blowing agent" are used interchangeably and refer to a substance that can produce a cellular structure during a foaming process. The blowing agent may comprise, but is not limited to, a physical blowing agent, a chemical blowing agent, or a mixed physical-chemical blowing agent.

In some embodiments, a single type of blowing agent may be used. The physical blowing agent may include, but is not limited to pentane, isopentane, cyclopentane, chlorofluorocarbons (CFC), hydrochlorofluorocarbons (HCFC), and liquid carbon dioxide ($CO_2$). The foaming process of a physical blowing agent is irreversible and endothermic. The chemical blowing agent may include, but is not limited to isocyanate, polyurethane, azodicarbonamide, hydrazine, sodium bicarbonate, and other nitrogen-based materials.

A compound of blowing agents may comprise at least two chemical agents, at least two physical agents, or a mix of a physical blowing agent and a chemical blowing agent. The compound of blowing agents may comprise blowing agents of different properties, such as, e.g., activation temperatures. That is, a blowing agent compound temperature may be defined as an average of the different activation temperatures of the blowing agents included therein. The average may be calculated on a per unit mass or per unit volume basis. The range of activation temperatures among the blowing agents may vary from one another by, e.g., about 5 degrees Celsius, or about 10 degrees Celsius, or about 30 degrees Celsius. In this way, foam structures with unique properties can be achieved through the selection of blowing agents with particular activation temperatures. The compound can combine the physical and chemical blowing agents together to balance out each other with respect to thermal energy released and absorbed through the foaming processes, thereby minimizing temperature fluctuation and improving thermal stability of the compound and/or resulting foam.

The blowing agent is considered effective when the expansion of the total volume results in at least 10 percent increase in comparison to the initial volume of a specimen prior to foaming. For example, the blowing agent may be sufficient to expand the volume of the specimen from an initial volume to a final volume. The final volume may be about 10 percent or more, by about 20 percent or more, by about 30 percent or more, by about 50 percent or more, by about 100 percent or more, or by about 300 percent or more of the initial volume prior to foaming.

In thermoplastic foaming, it is important to obtain foams with thin polymer walls covering each cell. To provide such structure, cell morphology must be controlled through altering the temperature. For example, if the temperature is too high, then the melt strength of the polymer can induce cell rupture. On the other hand, if the temperature is too low, cell growth may be restrained and insufficiently formed cells may be obtained within the foamed blanks.

The characteristics and the subsequent use of the foam blanks is determined by the material, the molecular structure of the material, the concentration or amount of the material, and the reaction temperature of the material of the yarn. Different formulations of yarn structure may be designed with the selection of structure, material, and foaming agent to form a multicellular foam having a variety of beneficial properties. For example, the concentration or the type of blowing agent can affect the cell size, expansion rate, and porosity of the multicellular foam. Similarly, the weight percentage or the concentration of the polymer core may affect the porosity of the multicellular foam.

The foam blank provides favorable properties within the midsole by providing increased hardness, water resistance, rigidity, cushioning, sound dampening, impact dampening and the like. All commonly known cellular materials have a convex cell shape and exhibit a positive Poisson's ratio, which is defined as the negative of the lateral strain divided by the axial strain when load is applied in the axial direction. The material comprising the foam undergoes a lateral contraction in response to an axial stretch, and a lateral expansion when subjected to axial compression, resulting in a positive Poisson's ratio. The Poisson's ratio range is between 0.1 to 0.4 for a typical polymeric foam. For example, the foam undergoes permanent characteristic and material property transformations when the foam is strained in tension at elevated temperature. Depending on the direction of the tension, a unidirectional or a bidirectional anisotropic foam may be formed.

Typically, a foam structure is isotropic. Isotropic refers to the properties of a material that have uniform behavior in all directions due to its crystalline structure. An isotropic material allows foaming of foams with equal behaviors and material properties in the same direction with a Poisson's ratio in three dimensions being between about −1.0 to 0.5. The benefits of the foamed multicellular yarn structure can be further exploited by programming the direction of the cellular structure. The cellular structure or a cellular material whose properties depend on the direction in which they are measured are described as being anisotropic. Anisotropy is defined as the material's tendency to react differently to stresses applied in different directions. The anisotropy in a cell shape can be conveniently measured by the ratio of the largest cell dimension and the smallest cell dimension, which is noted as the shape-anisotropy ratio, R. The anisotropy ratio of a typical foam is about 1.3 and the ratio typically varies between about 1 to about 10 and the anisotropic ratio increases with the cell size and decreases with the density. The anisotropy ratio, R, may be expressed in terms of Young's modulus. The ratio of Young's modulus along the largest cell dimension and the smallest cell dimension provides the anisotropy ratio R.

The anisotropic behavior of a foam structure may be introduced through the release of confinement in one or more directions. The process of increasing the anisotropy ratio of polymeric foams consists of restricting the cell growth to one direction through a mold, through a multiphase structure with different compositions, or through pre-orienting the fibers or filaments along the cell rise direction. The process of increasing the anisotropy ratio of polymeric foams may be extrapolated from understanding the linear elasticity, non-linear elasticity, plastic collapse, brittle crushing model, and the fracture toughness of the anisotropic foam.

In some embodiments, a freeze-casting technique may be used to produce foams with complex, three-dimensional cell structures that may be tuned during the solidification process. The freeze-casting technique provides a variety of advantages such as volume size, shape, and orientation of the cell structure that may be tuned by changing suspension characteristics (e.g., fluid type, additives, particle fraction, etc.) as well as solidification characteristics (e.g., velocity, temperature, direction, external force fields, etc.). Different solidification techniques such as unidirectional, bidirectional, radial, radial centric and dynamic freezing methods have been explored as means to control the porosity and microstructure for the freezing process.

Figure 13:
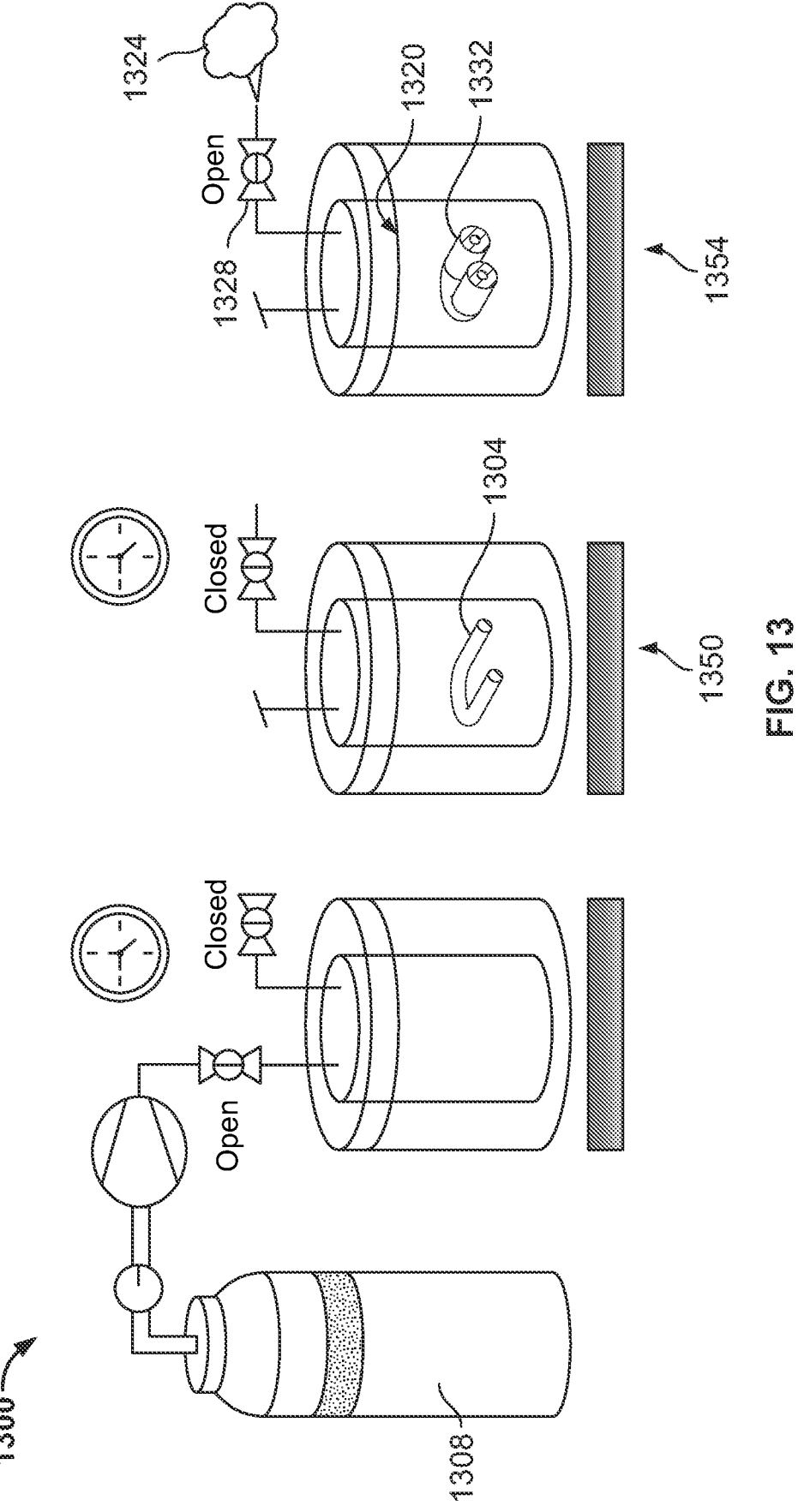
FIG. 13 is a principle process of creating an anisotropic foam from a polymer yarn.

FIG. 13 depicts the process 1300 of foaming a thermoplastic polymer yarn specimen 1304. The process 1300 comprises polymer saturation or impregnation of the yarn specimen 1304 with a blowing agent 1308. The blowing agent 1308 may be a physical blowing agent, a chemical blowing agent, or a mix of physical and chemical blowing agents. The process 1300 further includes the generation of a supersaturated polymer-blowing agent mixture that may be induced by increasing the temperature and pressure above the critical values. In addition, the process 1300 includes cell nucleation or cell growth 1320, as represented by expansion of the example yarn specimen 1304 in FIG. 13, of the thermoplastic yarn specimen 1304 through sudden depressurization 1324, which is represented schematically as a cloud, by operation of a valve 1328. Further, the process 1300 includes cell stabilization as the pressure and temperature reach the ambient pressure and ambient temperature to form a foam structure 1332. Batch foaming is well-known and is applied in two different methods that include a pressure-induced method and a temperature induced method. In the pressure-induced method, as shown in FIG. 13, a first step 1350 includes the yarn specimen 1304 being saturated by the blowing agent 1308. A second step 1354 includes the cell nucleation 1320 of the yarn specimen 1304 induced by the blowing agent 1308 through sudden depressurization 1324 caused by operation of the valve 1328. The sudden depressurization 1324 of the system to ambient atmospheric pressure initiates the foaming process to generate the foam structure 1332.

In the temperature-induced method, the process is similar to the pressure-induced method but at a lower temperature. After the saturation is complete, the polymer specimen 1304 is put into an oil bath at a temperature elevated above the ambient temperature for a period of time, which causes cell nucleation and growth. For example, the temperature of the oil bath may be maintained at, but not limited to, temperatures between 80 degrees to 150 degrees Celsius. After the cells are generated, the foam structure 1332 is put into a cooling bath in water or a solvent.

It will be understood that a supercritical fluid, as used herein, is a substance where the temperature and pressure of the substance is above its critical point, where distinct liquid phase and gas phase does not exist and is below the pressure required to compress the substance into a solid. The super critical fluid can dissolve materials like liquids and solids and when close to the critical point, small changes in pressure or temperature can result in large changes in density. Carbon dioxide and water are the most used supercritical fluids. The supercritical carbon dioxide has a critical point of 7.4 MPa at 31 degrees Celsius. The superheated water has a critical point of 22 MPa at 374 degrees Celsius, which resembles an organic solvent.

Further, it will be understood that a superheated fluid, as used herein, is a substance where the fluid is in equilibrium with vapor at a saturated vapor pressure. For example, a superheated water is a well-known superheated fluid. The superheated water is configured to be stabilized or metastabilized in an environment in which the overpressure raises the boiling point to where the liquid water is in equilibrium with the vapor, which may also be accomplished by heating the water in a sealed vessel having a headspace. While superheated fluid or water interacts with the foam structure, the relatively high temperature of the superheated fluid expands any gas trapped within the foam structure to enlarge the voids, thereby reducing the overall density of the foam structure. With respect to the supercritical condition, the medium, e.g., $CO_2$ or $N_2$, is elevated to beyond its critical point to allow diffusion into the foam structure to access small voids that are not accessible below the critical point, which is due, in part, to the relatively high density of the supercritical medium. Exposing the foam structure to the supercritical medium plasticizes portions of the foam structure and saturates the foam structure. In a subsequent step, the foam structure is regulated to a supersaturated state by, e.g., decreasing the pressure or increasing the temperature, to cause nucleation and relative grown of porous cells within the polymer matrix of the foam structure. As a result of the exposure to the supercritical medium and supersaturation, the overall density of the foam structure is reduced. These characteristics make each of the supercritical condition and superheated condition a favorable condition to perform extraction or impregnation processes, as the density can be adjusted continuously by altering the experimental conditions of temperature and pressure.

Figure 14:
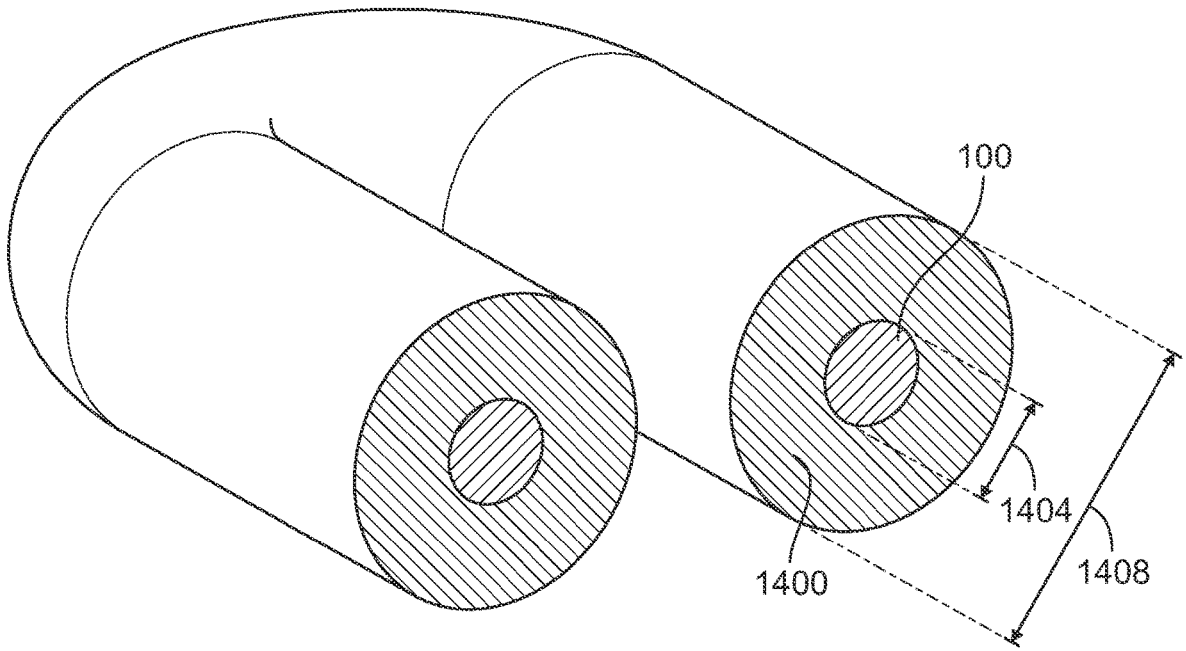
FIG. 14 is a cross-sectional view of the polymer yarn of FIG. 1 in a foamed state.

FIG. 14, depicts the cross-section of a foamed thermoplastic yarn 1400. The first inner diameter 1404 corresponds with the yarn 100 of FIG. 1 prior to being subject to the foaming process, such as the foaming processes described herein, and the second outer diameter 1408 depicts the yarn 100 of FIG. 1 after being foamed to form the foamed thermoplastic yarn 1400. When the yarn 100 interacts with a supercritical blowing agent such as $CO_2$, the yarn 100 is saturated with the gas above supercritical conditions. By decreasing the pressure or increasing the temperature, the yarn 100 is driven to a supersaturated state where the porous cells within the polymeric matrix are propagated. The fact that the yarn 100 is under the supercritical condition alters the physical properties such as melting point, heat-glass transition, crystallization temperatures, crystallization rate, and swelling. In general, the penetration of the solvent induces swelling by reorienting the polymer chains to form a thermodynamically favorable crystalline state. The foaming process induces a change in the diameter, i.e., the change depicted from the first diameter 1404 to the second diameter 1408 of the polymer yarn, by increasing the size and, simultaneously, increasing the porosity of the structure and reducing the density of the yarn.

Figures 15A, 15B:
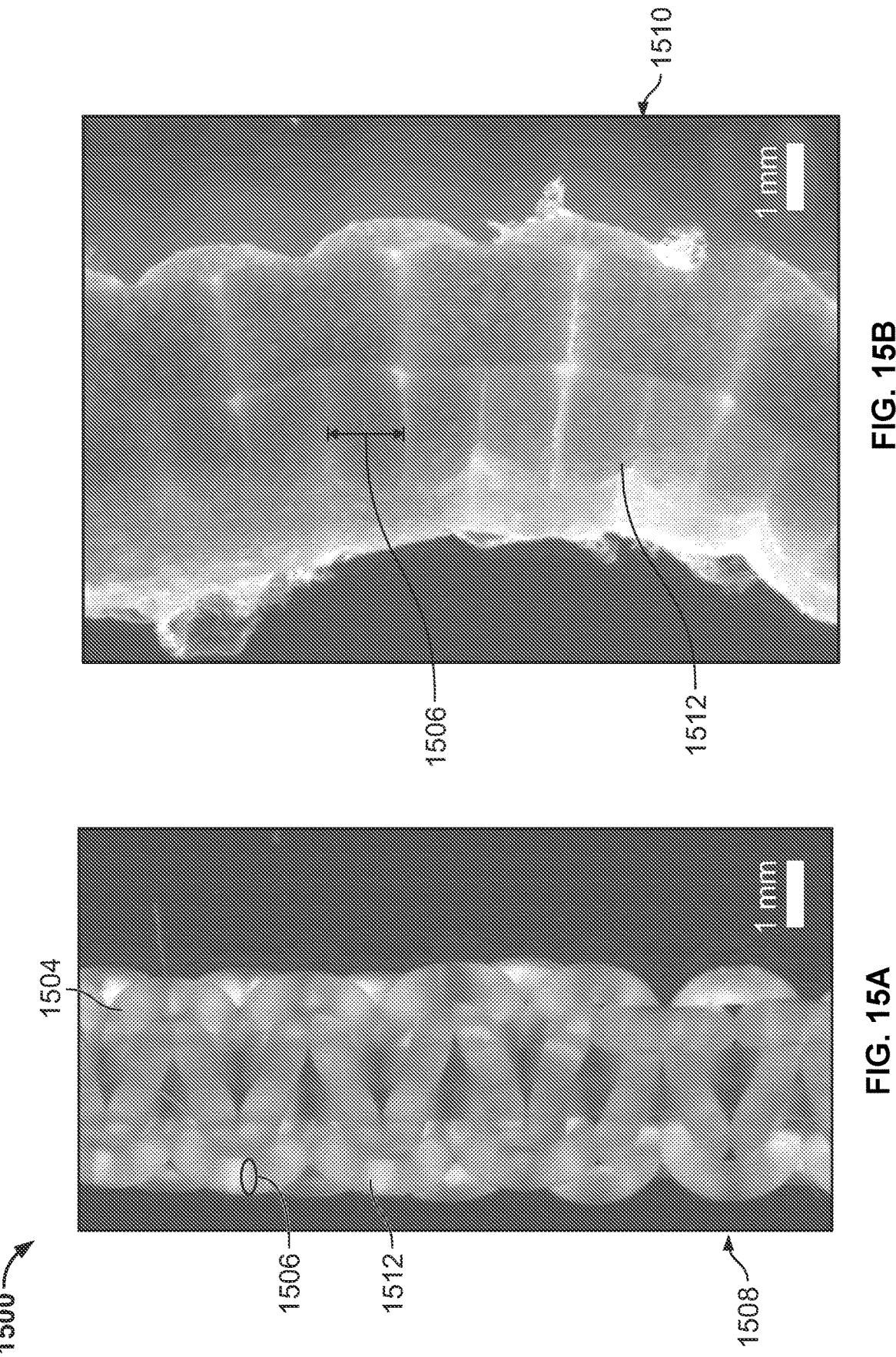
FIG. 15A is a perspective view of a cobra knot structure formed from polyamide 6 filaments prior to a foaming process.
FIG. 15B is a perspective view of a cobra knot structure formed from polyamide 6 filaments after a foaming process.

Referring to FIGS. 15A-B, a procedure was conducted on a knot structure 1500, which will be understood as a cobra knot, formed from a polyamide 6 monofilament 1504 to observe the change in diameter 1506 before foaming 1508 and after foaming 1510 occurs. The cobra knot structure 1500 formed by polyamide 6 monofilaments 1504 was subjected to supercritical carbon dioxide in order to determine the change in diameter 1506 of the cobra knot structure 1500 during the foaming process. The diameter 1506 of the monofilament yarn 1512 increased by less than 25%. When the monofilament yarn 1512 was subjected to superheated water and supercritical carbon dioxide, the diameter 1506 of the polyamide 6 monofilaments 1504 increased by more than 125%. The combination of supercritical fluid and superheated fluid may be desirable for foams that require highly porous structures.

Described hereinbelow are methods of foaming yarn structures. The yarn structure may comprise any of the yarn materials, yarn characteristics, and blowing agents mentioned above. Under supercritical conditions, the impregnation of the blowing agents induces the material to foam, forming at least one foamed area along the yarn structure. For instance, the yarn structure incorporating any of the thermoplastic yarns may be processed under supercritical conditions to create a multicellular foam comprising a plurality of cavities. The cavities may include an open-cell foam structure or a closed-cell foam structure. The introduction of gas bubbles from the foaming agent induces the forming of the cellular structure during the manufacturing process. Once foamed, the foamed multicellular yarn structure has different mechanical properties in comparison to the un-foamed yarn structure. For example, the foamed structure may impart increased texture, strength, cushioning, abrasion resistance, and/or a combination of other material properties.

FIG. 16 depicts an exemplary process 1600 of foaming a yarn structure. A first step 1604 includes selecting yarn material based on certain properties and characteristics thereof. The yarn material may be composed of any of the yarn materials described herein, such as, e.g., a recycled plastic, TPU, nylon, or the like. The selection of the particular yarn may be based on one or more of the particular properties and characteristics, such as, e.g., denier, tear strength, color, and/or thickness, among others. A second step 1606 includes intertwining the selected yarns to form a yarn structure. The selected yarns may be intertwined using any of the methods described above to form the desired yarn structure. A third step 1608 includes inlaying the yarn structure into a first shoe midsole mold and placement of the first shoe midsole mold comprising the yarn structure into an autoclave. A fourth step 1610 includes infiltrating and saturating the yarn structure with an agent, e.g., a gas at supercritical conditions, to initiate the foaming process. A fifth step 1612 includes foaming the yarn structure, which is triggered by a rapid depressurization of the autoclave. A sixth step 1614 includes removing the foamed yarn structure from the autoclave and the first shoe midsole mold. A seventh step 1616 includes placing the foamed yarn structure in a second mold to provide the shape of the midsole. The second compression molding process occurs at an operating temperature that elevates a component temperature of anisotropic foam blank to at least 30 degrees Celsius above the melting temperature but without producing plastic deformation thereof. It will be appreciated that the melting temperature of the anisotropic foam blank may be determined by the particular materials used and/or properties thereof after foaming.

In some embodiments, the yarn structures comprise a unidirectional and/or a bidirectional property. The yarn structure comprising the unidirectional and/or the bidirectional properties may be pre-oriented within a foam blank to form a tunable and functionable anisotropic foam blank. In some embodiments, the anisotropic foam blank may include a plurality of first cells having a first cell growth orientation and a plurality of second cells having a second cell orientation, the first cell growth orientation being different from the second cell growth orientation. The anisotropic cell orientations provided by the different yarn structures described above enable the foam blank to incorporate desirable characteristics at an ideal location. The different yarn structures and configurations described above may provide specific functions to be housed within the foam blank, such as a collapsing structure for flexibility in one or more particular directions, a rebound structure for elasticity in one or more particular directions, and a support structure for stiffness in one or more particular directions. The pre-orientation of the different yarn structures and configurations of the yarn enables specific regions and areas of the foam to exhibit different technical characteristics, direction-dependent characteristics, and performance characteristics.

Figure 17:
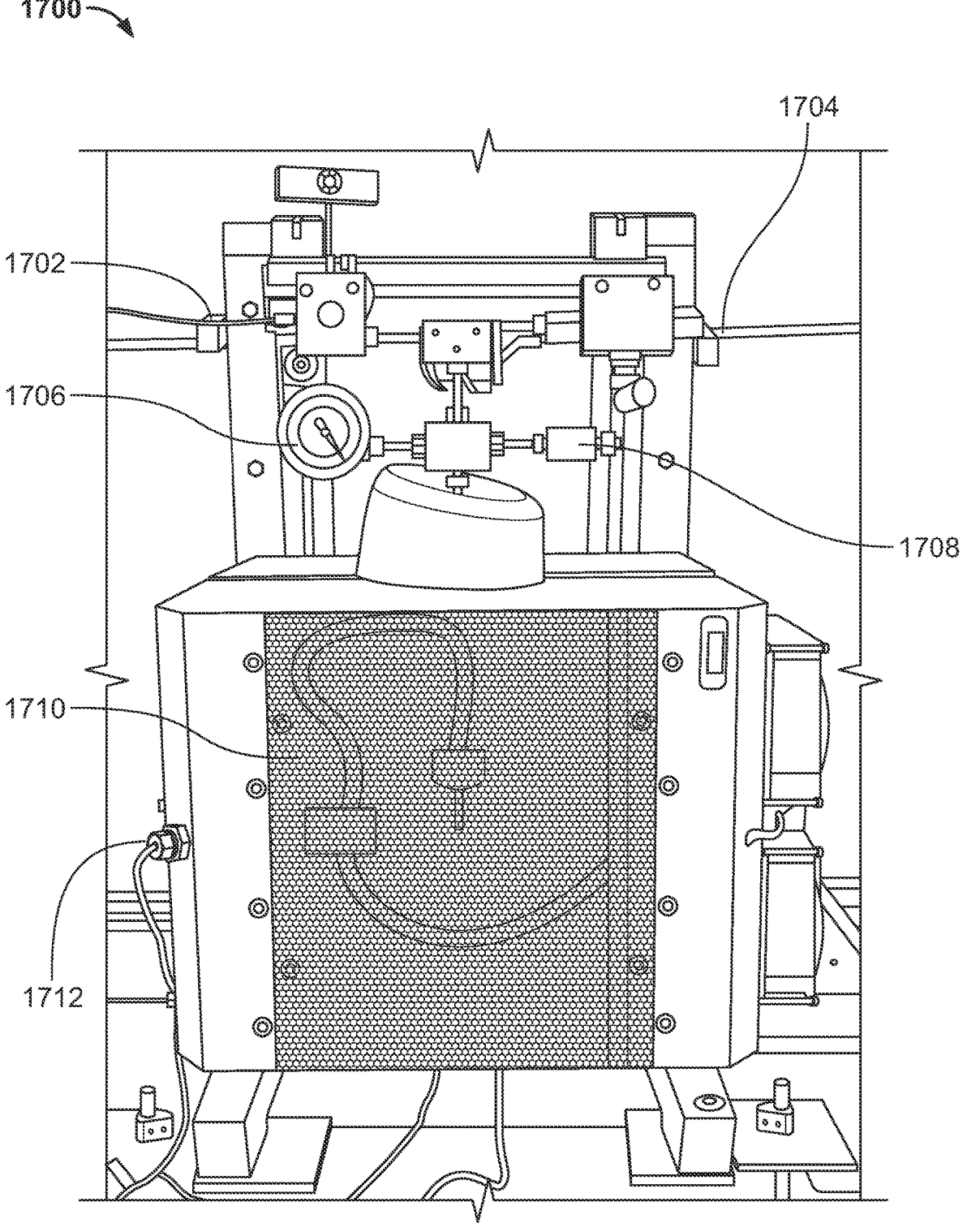
FIG. 17 is a perspective view of a high pressure reactor.

Referring to FIG. 17, a high-pressure reactor system 1700 used for fabricating a foam blank is shown. The high-pressure reactor system 1700 includes an inlet valve 1702, an outlet valve 1704, a pressure gauge 1706, a rupture disk 1708, a high-pressure reactor 1710, a thermocouple 1712, and a PID controller (not shown). The inlet valve 1702 may be a needle valve (not shown) which transfers $CO_2$ gas. The pressure gauge 1706 measures the pressure in the high-pressure reactor system 1700 and the rupture disk 1708, also known as the pressure safety disk, is a pressure-relief safety device that protects the pressurized high-pressure reactor 1710. The high-pressure reactor 1710 includes an interior chamber (not shown) that is configured to receive a yarn structure sample or section that may be infiltrated with the supercritical gas to create the foam blank. The high-pressure reactor 1710 is connected to a thermocouple 1712 and a PID controller (not shown) to sense temperature changes and maintain and adjust a specific temperature. The outlet valve 1704 may be a ball valve (not shown) to rapidly depressurize the reactor or may include a needle valve for slow depressurization The mechanics of microcellular structure may be different based on the method of forming the yarn structure such as twisting or braiding. In the present disclosure, the mechanics of the microcellular structure of anisotropic polyamide filaments is studied by analyzing the crystallinity determined by differential scanning calorimetry, change in diameter after foaming, change in density after foaming, and/or change in area of the cross section after foaming. FIG. 18A depicts a braided yarn structure 1800 that is formed by the Kumihimo disk shown in FIG. 11 prior to foaming and FIG. 18B depicts a foamed braided yarn structure 1802. When a fiber 1804 comprising the braided yarn structure 1800 is pulled in tension, the percent crystallinity and the diameter of the fiber changes based on the strain caused by the tension. The percent crystallinity can be determined by comparing the density of the sample to the amorphous density of the sample by using differential scanning calorimetry. Table. I show the percent crystallinity relationship and change in diameter with respect to the strain.

TABLE I

Percent crystallinity and change in diameter with respect to strain induced by the fiber pulled in tension

| Strain (%) | Percent Crystallinity | Diameter Decrease (%) |
|---|---|---|
| 0 | 19.1 | 0 |
| 5 | 24.1 | 9.3 |
| 10 | 25 | 12.1 |
| 15 | 28 | 13.8 |
| 20 | 21.8 | 15.17 |

The braided yarn structure 1800 includes a density of approximately 1.22 g/cm3 with a filament diameter of 0.56 mm. First, a soaking step includes the braided yarn structure 1800 being soaked by the superheated water with a temperature ranging between approximately 101 degrees Celsius and approximately 105 degrees Celsius and a pressure ranging between approximately 20.7 MPa (Mega Pascal) and approximately 34.5 MPa for approximately 4 hours.

Second, a foaming step occurs at a temperature ranging between approximately 106 degrees Celsius and approximately 112 degrees Celsius and at a pressure ranging between approximately 20.7 MPa and approximately 34.5 MPa. The foaming occurs through a rapid depressurization that forms the foamed braided yarn structure 1802. The foamed braided yarn structure 1802 shows an increase in the filament diameter from 0.56 mm to 1.57 mm, which is an approximately 180% increase in filament diameter size, and a decrease in density from 1.22 g/cm3 to 0.332 g/cm3. Accordingly, the foamed braided yarn structure 1802 exhibits a change in density of about 60%. In some embodiments, the foamed braided yarn structure 1802 exhibits a change in density of at least 45%, or at least 50%, or at least 60%, or more. It will be appreciated that the twisted yarn structure 608 also may exhibit similar changes as a result of the techniques described herein, such that the twisted yarn structure 608 may exhibit a change in density of at least 45%, or at least 50%, or at least 60%, or more. The foamed braided yarn structure 1802 also shows the braid has imposed bias by maintaining the twist it had prior to foaming. Table II shows the increase in fiber area, change in density, and the porosity of the foamed braided yarn structure 1802 based on the foaming temperature.

TABLE II

Braided Structure Foaming Samples

| Braided Sample | Soak Temp (° C.) | Foam Temp (° C.) | Pressure (MPA) | Fiber Area Increase | Density (g/cm³) | Porosity |
|---|---|---|---|---|---|---|
| 1 | 103 | 108 | 20.7 | 67% | 0.652 | 45% |
| 2 | 103 | 109 | 20.7 | 56% | 0.648 | 46% |
| 3 | 103 | 110 | 20.7 | 283% | 0.993 | 17% |
| 4 | 103 | 112 | 20.7 | 54% | 0.778 | 35% |

Figures 19A, 19B, 19C, 19D:
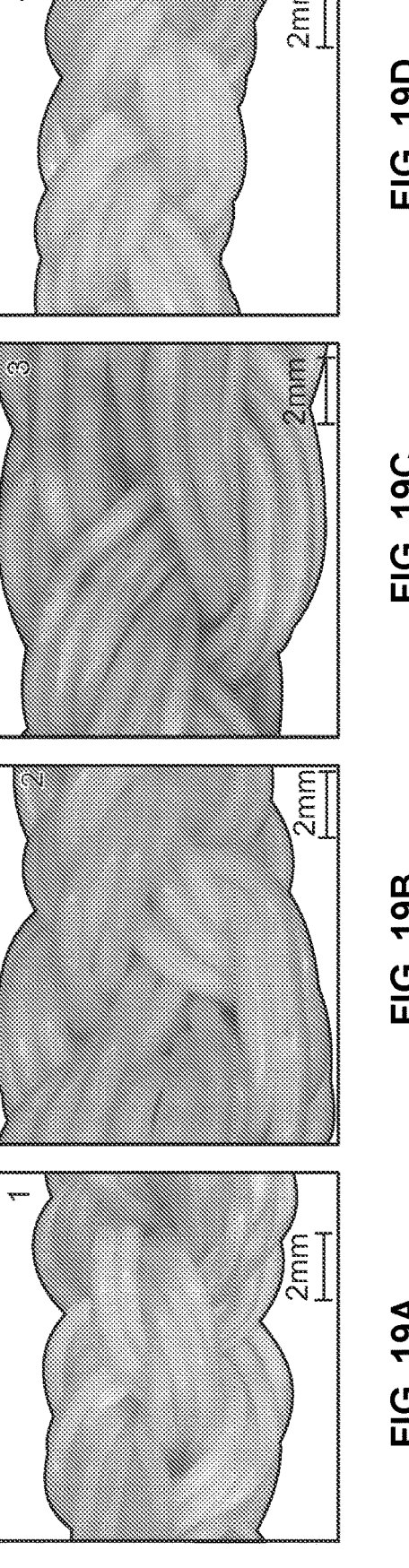
FIG. 19A is a perspective view of a braided yarn structure foamed at 108 degrees Celsius.
FIG. 19B is a perspective view of a braided yarn structure foamed at 109 degrees Celsius.
FIG. 19C is a perspective view of a braided yarn structure foamed at 110 degrees Celsius.
FIG. 19D is a perspective view of a braided yarn structure foamed at 112 degrees Celsius.

FIGS. 19 A-D shows the corresponding cross-sectional view of the braided structure foaming samples 1-4 described above.

FIG. 20A depicts a twisted yarn structure 2000 that is formed using the method shown in FIGS. 7A-7E. First, a soaking step includes the twisted yarn structure 2000 being soaked by the superheated water with a temperature ranging between approximately 101 degrees Celsius and approximately 105 degrees Celsius and a pressure ranging between approximately 20.7 MPa (Mega Pascal) and approximately 34.5 MPa for approximately 4 hours. Second, a foaming step occurs at a temperature ranging between approximately 106 degrees Celsius and approximately 112 degrees Celsius and at a pressure ranging between approximately 20.7 MPa and approximately 34.5 MPa. Referring to FIG. 20B, the foaming occurs through a rapid depressurization that forms a foamed twisted yarn structure 2002. Table III shows the increase in fiber area, change in density, and the porosity of the foamed twisted yarn structure 2002 based on the foaming temperature.

TABLE III

Twisted Structure Foaming Samples

| Braided Sample | Soak Temp (° C.) | Foam Temp (° C.) | Pressure (MPA) | Fiber Area Increase | Density (g/cm³) | Porosity |
|---|---|---|---|---|---|---|
| 1 | 103 | 110 | 34.5 | 492% | 0.536 | 55% |
| 2 | 102 | 108 | 34.5 | 366% | 0.400 | 66% |

TABLE III-continued

Twisted Structure Foaming Samples

| Braided Sample | Soak Temp (° C.) | Foam Temp (° C.) | Pressure (MPA) | Fiber Area Increase | Density (g/cm³) | Porosity |
|---|---|---|---|---|---|---|
| 3 | 103 | 108 | 20.7 | Melt | 0.226 | 77% |
| 4 | 102 | 108 | 20.7 | 378% | 0.581 | 51% |

Figures 21A, 21B, 21C, 21D:
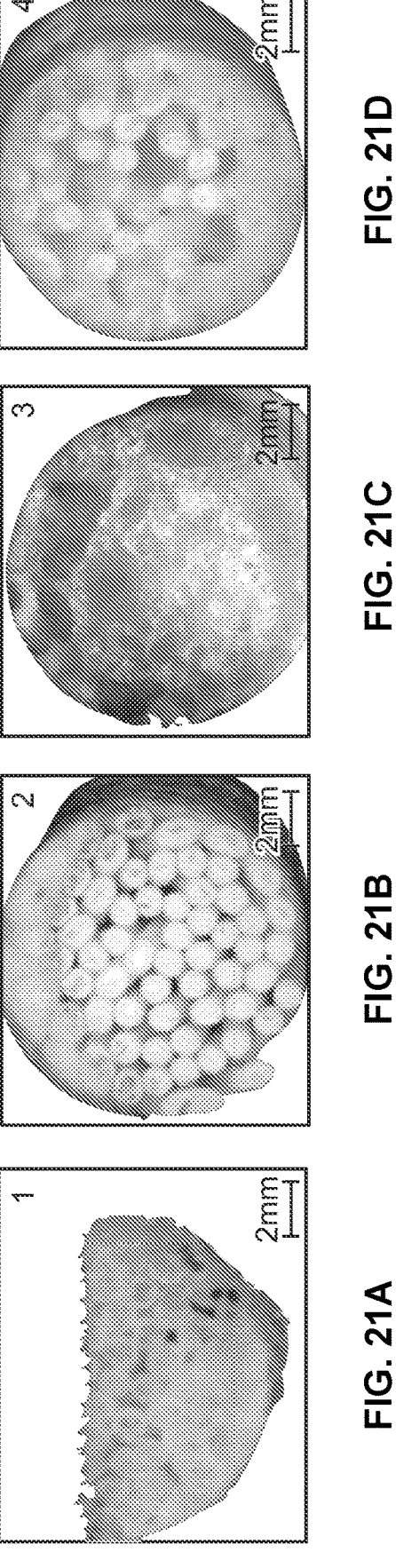
FIG. 21A is a perspective view of a twisted yarn structure soaked at 103 degrees Celsius and foamed at 110 degrees Celsius at 34.5 MPa.
FIG. 21B is a perspective view of a twisted yarn structure soaked at 102 degrees Celsius and foamed at 108 degrees Celsius at 34.5 MPa.
FIG. 21C is a perspective view of a twisted yarn structure soaked at 103 degrees Celsius and foamed at 108 degrees Celsius at 20.7 MPa.
FIG. 21D is a perspective view of a twisted yarn structure soaked at 102 degrees Celsius and foamed at 108 degrees Celsius at 20.7 MPa.

FIGS. 21 A-D shows the corresponding cross-sectional view of the twisted composite foaming samples 1-4 described above.

In the present disclosure, a PA-PS (polyamide-polysty-rene) composite sample is created using the method shown in FIGS. 7A-7E to study the orientation of the filaments with respect to the circumferential shear strain assembly. For example, the pitch at which the yarns are arranged may result in poor adhesion between the filaments of the braided structure during a compressive behavior. Since the midsole of an article of footwear is repeatedly subjected to compressive behavior, it is important to understand the relationship between the orientation of the filaments and the compressive behavior. The filament sample includes 60 filaments with a length between approximately 6.2 cm and 6.6 cm that is twisted between 2.5 and 4 full rotations with a hanging mass of 1 kg. A styrene monomer, a 0.3 mol % tert-butyl peroxy-benzoate initiator, and a methanol solvent is used for fabricating the PA-PS composite sample. First, the PA-PS composite sample is soaked at 75 degrees Celsius for 24 hours at 27.6 MPa. Second, a PS polymerization occurs at 115 degrees Celsius for between approximately 4 hours and 16 hours at 27.6 MPa. After the polymerization occurs, the composite sample is rapidly depressurized to ambient temperature using the outlet valve 1704 (see FIG. 17) in the form of a ball valve. The change in diameter of the PA-PS composite samples can be determined by observing an initial radial pitch (Pi) and a final radial pitch (Pf), an initial height and a final height, and measured change in rotation. Table. IV depicts the relationship between the polymerization time, the pitch of the fiber before swelling, the pitch after the swelling, and the change in diameter.

TABLE IV

Polymerization Tests

| PA-PS Sample | Polymerization Time (hours) | Pi (Turns/meter) | Pf (Turns/meter) | Diameter Increase % |
|---|---|---|---|---|
| 1 | 4 | 37.9 | 59.4 | 122% |
| 2 | 16 | 64.5 | N/A | 132% |
| 3 | 16 | 37.9 | 60.5 | 135% |
| 4(Foamed) | 16 | 37.9 | N/A | 178% |

The increased diameter of the filaments corresponds in proportion with an increase in porosity of the yarn structure comprising the filaments. That is, greater increases in diameter correspond with greater increases in porosity, which is an important property of proper foaming applications. The change in pitch, i.e., angle, of the filaments before and after the swelling may be a resultant of the change in diameter. As described above, the pitch of the twisted or braided yarn structure may cause poor adhesion when exposed to compression. Therefore, it is necessary to understand the relationship among the pitch before and after the swelling and the change in diameter of the filaments by measuring a circumferential shear strain. As illustrated above, Sample 1 was observed to have an initial radial pitch Pi of 37.9 turns/meter and a final radial pitch Pf of 59.4 turns/meter, which is an increase of 56.7% in radial pitch, while a diameter increase of 122% was also observed. By contrast, Sample 3 was observed to have an initial pitch Pi of 37.9 turns/meter and a final radial pitch Pf of 60.5 turns/meter, which is an increase of 59.6% in radial pitch, while a diameter increase of 135% was also observed. The primary difference between Samples 1 and 3 is the polymerization time, where Sample 3 was subjected to 16 hours of polymerization while Sample 1 was only subjected to 4 hours. Accordingly, it may be deduced that subjecting samples to increased polymerization time can permit greater increases in radial pitch, and such increases in radial pitch may permit greater diameter increases. It will also be understood that Sample 4 underwent 16 hours of polymerization and was subjected to a foaming process, which resulted in a diameter increase of 178% that is significantly greater than the diameter increase of any of Samples 1, 2, and 3.

Figure 22:
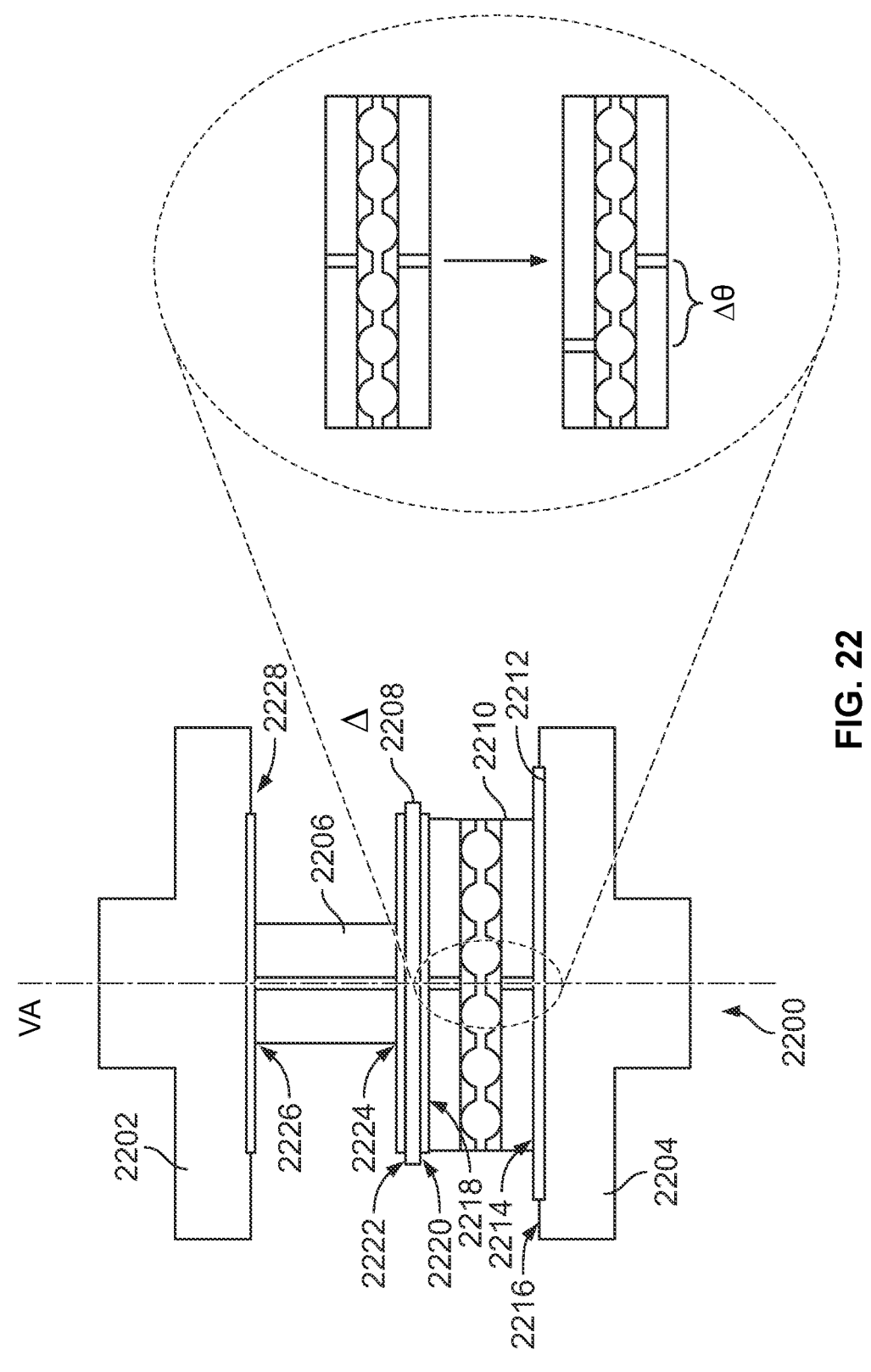
FIG. 22 is a schematic representation of an apparatus to measure the circumferential shear strain.

Accordingly, FIG. 22 depicts an apparatus 2200 that enables the measurement of the circumferential shear strain with respect to compression. The apparatus 2200 includes a top compression clamp 2202, a bottom compression clamp 2204, a sample plate 2208, and a thrust ball bearing 2210. An adhesive 2212 is used to bond a bottom surface 2214 of the thrust ball bearing 2210 with an upper surface 2216 of the bottom compression clamp 2204. An upper surface 2218 of the thrust ball bearing 2210 is bonded to a lower surface 2220 of the sample plate 2208, and an upper surface 2222 of the sample plate 2208 is bonded to a lower surface 2224 of the sample 2206 by the adhesive 2212. An upper surface 2226 of the sample 2206 is bonded to a lower surface 2228 of the top compression clamp 2202 by the adhesive 2212. The adhesive 2212 limits the rotation of the surfaces about the vertical axis VA except for the thrust ball bearing 2210. The thrust ball bearing 2210 is the only surface available to rotate when subjected to a compressive force to measure the circumferential shear strain. The circumferential shear strain may be measured by multiplying the change in angle about the vertical axis by the thrust ball bearings and the radius of the sample divided by the height of the sample, as illustrated in Equation 1 below, where R is the radius of the sample, H is the height of the sample, and $\Delta\theta$ is the change in angle induced to the thrust ball bearing.

$$\gamma_{\theta Z} = \frac{R\Delta\theta}{H} \qquad \text{(Eq. 1)}$$

For example, the 4-hour PA-PS composite sample experienced 15 degrees of rotation by 0.19 mm/mm of compressive strain with a radius of 0.0053 m and a height of 0.011 m. The circumferential shear strain equates to 0.13 as determined by Equation 1 above. In this way, compression testing may provide a way of calculating the ideal pitch and/or diameter as derived by measuring the circumferential shear strain during compression and employing Equation 1.

Figure 23:
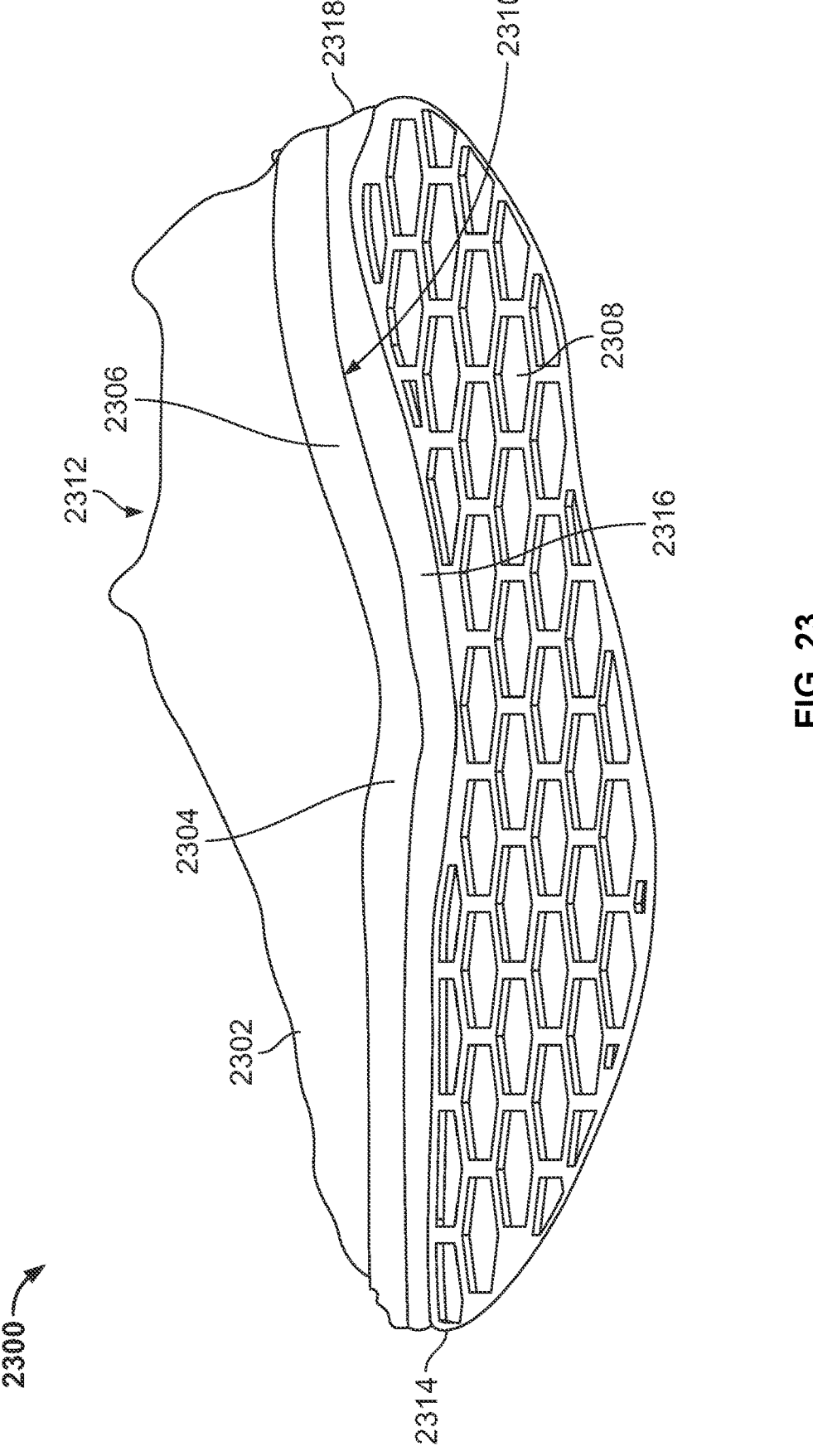
FIG. 23 is a perspective view of a bottom and medial side of an article of footwear configured as a right shoe that includes an upper and a sole structure, the sole structure including an anisotropic foam.

The present disclosure is directed to an article of footwear or specific components of the article of footwear, such as a sole. FIG. 23 depicts an exemplary embodiment of an article of footwear 2300 including an upper 2302 and a sole structure 2304. The sole structure defines a midsole 2306 and an outsole 2308. The sole structure 2304 includes an anisotropic foam 2310 that provides enhanced cushioning and tunable deformation of the sole structure 2304. The upper 2302 is attached to the sole structure 2304 and together with the sole structure 2304 defines an interior cavity 2312 into which a foot of the user may be inserted. For reference, each of the shoes defines a forefoot region 2314, a midfoot region 2316, and a heel region 2318.

In some embodiments, the midsole 2306 comprising the tunable foam 2310 may provide the benefits of a multicomponent sole. Generally speaking, multicomponent soles of the prior art include distinct components, such as a plate, that are assembled together. In some instances, the plate is sandwiched between upper and the lower segments of the midsole. However, the present disclosure provides for the sole structure 2304 to include anisotropic foam 2310 that achieves the desired functionality afforded by the multicomponent midsole but without the need for manufacturing and assembling multiple components. Put another way, without adding additional components or elements of a multicomponent midsole, the midsole 2306 comprising pre-oriented anisotropic foams 2310 of the present disclosure may be formed, i.e., tuned, using the methods, materials, and techniques described herein to provide, and even exceed, the performance and functionality of a multicomponent midsole.

In another embodiment, the anisotropic foam 2310 may vary in one or more tunable properties across the sole structure 2304. For example, the heel region 2318 may comprise pre-oriented anisotropic foam 2310 with rebounding and shock absorbing properties, whereas the midfoot region 2316 can comprise pre-oriented anisotropic foam 2310 with greater flexibility, lower stiffness, and/or energy return features. In some embodiments, the sole structure 2304 may be composed of multiple anisotropic foam 2310 in the form of segments disposed in particular locations along the heel region 2318, midfoot region 2316, and the forefoot region 2314, or combinations thereof. In some embodiments, the midsole 2306 is a single, unitary component including the pre-oriented anisotropic foam 2310 in the forefoot region 2314, heel region 2318, midfoot region 2316, or combinations thereof. Thus, the pre-oriented anisotropic foam 2310 provides the midsole 2306 with a variation in selective or tunable properties and functions, such as a variation in stiffness or flexibility. The pre-oriented anisotropic foam 2310 may become pre-oriented using the twisting or braiding techniques described herein.

As described herein, a multicellular foam blank comprising a polymer yarn structure may exhibit beneficial properties such as ease of manufacturing, minimal waste, and versatile designs, among other benefits. Further, a pre-oriented anisotropic midsole may allow better waste management and recycling of materials after the shoe is discarded. The sole structure 2304 comprising the midsole 2306, such as a single layer midsole, facilitates separation of materials allowing the thermoplastics to be melted down and turned into flakes and pellets. Conventional shoe manufacturing techniques employ a variety of machinery and chemicals to fabricate shoes. On average, shoes comprise numerous parts that have been fabricated from a variety of different materials, which contributes to the creation and/or retention of greenhouse gases, including carbon dioxide, in the atmosphere. Additionally, shoes formed by conventional manufacturing techniques and made of multiple components are difficult to recycle due to the differences in materials used, especially where those materials are adhered together. As a result, approximately 80% of sneakers go to landfills where the shoes break down over long periods of time and release toxins, chemicals, and fossil fuels into the surrounding environment. In the present disclosure, the sole structure is fabricated from an anisotropic foam from polymer yarns to eliminate or reduce the use of multiple components within the sole structure. Accordingly, it is not necessary to disassemble the sole structure to remove embedded or attached components before recycling the shoe. Further, the reduced number of components may lead to reduced pollution caused by shipping and transportation associated with delivering the components to a single assembly site, and may also reduce the number of machines used in one or more factories to produce the shoe and its components. In addition, the foaming process and anisotropic foam may provide enhanced stability, durability, and puncture resistance to extend the useful life of the shoe. Additionally, assembling multiple components typically involves the use of adhesives or cements, which may release toxins to the environment at various stages of use, such as during assembly or while recycling. The present disclosure affords for sole structures without multiple components or with fewer components, which may reduce or eliminate the need for using adhesives and/or cements, thereby reducing the environmental impacts thereof.

Any of the embodiments described herein may be modified to include any of the structures or methodologies disclosed in connection with different embodiments. Similarly, materials or construction techniques other than those disclosed above may be substituted or added in some embodiments according to known approaches. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto.

We claim:

1. A method of making a midsole, comprising the steps of:
   selecting a plurality of yarns, wherein at least two yarns of the plurality of yarns have different properties relative to one another;
   bundling the plurality of yarns to form a bundled yarn structure;
   intertwining the bundled yarn structure to form a twisted yarn structure, the intertwining comprising the steps of:
   fixing an end of the bundled yarn structure;
   applying axial tension to the bundled yarn structure; and
   rotating the bundled yarn structure to form the twisted yarn structure;
   depositing the twisted yarn structure into a first mold within an autoclave;
   applying a supercritical fluid to the twisted yarn structure, wherein the supercritical fluid infiltrates and saturates the twisted yarn structure;
   depressurizing the autoclave to cause a foaming process therein to convert the twisted yarn structure into an anisotropic foam blank; and
   depositing the anisotropic foam blank within a second mold that is configured as a midsole for an article of footwear.

2. The method of claim 1, wherein at least one yarn of the plurality of yarns is composed of at least one of a thermoplastic polymer, a thermosetting polymer, or an elastomeric polymer.

3. The method of claim 1, wherein the anisotropic foam blank includes a first cell growth direction that is parallel to a longitudinal direction of the twisted yarn structure.

4. The method of claim 3, wherein the anisotropic foam blank includes a second cell growth direction perpendicular to the longitudinal direction of the twisted yarn structure.

5. The method of claim 1, wherein the supercritical fluid comprises a superheated water, a supercritical carbon dioxide, or both.

6. The method of claim 1, wherein a diameter of at least one yarn of the plurality of yarns is increased by at least 120% after depressurizing the autoclave.

7. The method of claim 1, wherein a density of at least one yarn of the plurality of yarns is decreased by at least 50% after depressurizing the autoclave.

8. A method of making a midsole, comprising the steps of:

selecting a plurality of yarns, wherein at least two yarns of the plurality of yarns have different material properties relative to one another;

bundling the plurality of yarns to form a bundled yarn structure;

intertwining the bundled yarn structure using a braiding technique to form a braided yarn structure, wherein an axial tension is applied to the bundled yarn structure;

depositing the braided yarn structure into a first mold and within an autoclave;

applying a supercritical fluid to the braided yarn structure, wherein the supercritical fluid infiltrates and saturates the braided yarn structure;

depressurizing the autoclave to cause a foaming process therein to convert the braided yarn structure into an anisotropic foam blank; and depositing the anisotropic foam blank within a second mold that is configured as a midsole for an article of footwear.

9. The method of claim 8, wherein at least one yarn of the plurality of yarns is composed of at least one of a thermoplastic polymer, a thermosetting polymer, or an elastomeric polymer.

10. The method of claim 8, wherein the supercritical fluid comprises a superheated water, a supercritical carbon dioxide, or both.

11. The method of claim 8, wherein a diameter at least one yarn of the plurality of yarns is increased by at least 120% after depressurizing the autoclave.

12. The method of claim 8, wherein a density of at least one yarn of the plurality of yarns is decreased by at least 50% after depressurizing the autoclave.

13. The method of claim 8, wherein a circumferential shear strain of the plurality of yarns is greater than 0.05 after depressurizing the autoclave.

14. The method of claim 8, wherein the braiding technique is a Kumihimo braiding technique.

* * * * *